(12) United States Patent
Howard et al.

(10) Patent No.: US 11,978,931 B2
(45) Date of Patent: May 7, 2024

(54) FLOW BAFFLE FOR MOLTEN CARBONATE FUEL CELL

(71) Applicants: ExxonMobil Technology and Engineering Company, Annandale, NJ (US); FUELCELL ENERGY, INC., Danbury, CT (US)

(72) Inventors: Christopher Howard, Stratford, CT (US); Brandon J. O'Neill, Spring, TX (US); Paul J. Rubas, Milford, NJ (US); Frank Hershkowitz, Basking Ridge, NJ (US); Lu Han, Ringoes, NJ (US); Lawrence J. Novacco, Brookfield, CT (US); Frank J. Dobek, Jr., Colchester, CT (US); Keith E. Davis, Southbury, CT (US); Brian Bullecks, Sumner, ME (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 117 days.

(21) Appl. No.: 17/173,786

(22) Filed: Feb. 11, 2021

(65) Prior Publication Data
US 2022/0255095 A1    Aug. 11, 2022

(51) Int. Cl.
*H01M 8/04082*    (2016.01)
*H01M 8/04089*    (2016.01)
(Continued)

(52) U.S. Cl.
CPC ... *H01M 8/04201* (2013.01); *H01M 8/04089* (2013.01); *H01M 8/244* (2013.01); *H01M 8/2485* (2013.01)

(58) Field of Classification Search
CPC ......... H01M 8/04201; H01M 8/04089; H01M 8/244; H01M 8/2485; H01M 8/0254;
(Continued)

(56) References Cited

U.S. PATENT DOCUMENTS 3,615,839 A    10/1971   Thompson et al.
3,970,474 A     7/1976   Anbar et al.
(Continued)

FOREIGN PATENT DOCUMENTS

CA    2120858 A1    10/1994
CA    2325072 A1     4/2002
(Continued)

OTHER PUBLICATIONS

"Heat of Combustion", Wikipedia, Retrieved from Internet URL : http://en.wikipediaorg/wiki/Lower_heating_value, accessed on Jun. 24, 2014, pp. 8.
(Continued)

*Primary Examiner* — Christian Roldan
(74) *Attorney, Agent, or Firm* — Shook Hardy & Bacon L.L.P.

(57) ABSTRACT

Molten carbonate fuel cell configurations are provided that allow for introduction of an anode input gas flow on a side of the fuel cell that is adjacent to the entry side for the cathode input gas flow while allowing the anode and cathode to operate under co-current flow and/or counter-current flow conditions. It has been discovered that improved flow properties can be achieved within the anode or cathode during co-current flow or counter-current flow operation by diverting the input flow for the anode or cathode into an extended edge seal region (in an extended edge seal chamber) adjacent to the active area of the anode or cathode, and then using a baffle to provide sufficient pressure drop for even flow distribution of the anode input flow across the anode or
(Continued)

cathode input flow across the cathode. A second baffle can be used to create a pressure drop as the anode output flow or cathode output flow exits from the active area into a second extended edge seal region (in a second extended edge seal chamber) prior to leaving the fuel cell.

11 Claims, 12 Drawing Sheets

(51) Int. Cl.
  *H01M 8/244* (2016.01)
  *H01M 8/2485* (2016.01)
(58) Field of Classification Search
  CPC .............. H01M 8/0256; H01M 8/0258; H01M 8/0265; H01M 2008/147; H01M 8/145; H01M 8/04104; Y02E 60/50
  USPC ........................................................ 429/459
  See application file for complete search history.

(56) References Cited

U.S. PATENT DOCUMENTS

| | | |
|---|---|---|
| 4,041,210 A | 8/1977 | Van Dine |
| 4,160,663 A | 7/1979 | Hsieh |
| 4,389,467 A | 6/1983 | Singh et al. |
| 4,567,117 A | 1/1986 | Patel et al. |
| 4,702,973 A | 10/1987 | Marianowski |
| 4,772,634 A | 9/1988 | Farooque |
| 4,800,052 A | 1/1989 | Swarr et al. |
| 4,810,595 A | 3/1989 | Kahara et al. |
| 4,917,971 A | 4/1990 | Farooque |
| 4,921,765 A | 5/1990 | Gmeindl et al. |
| 4,925,745 A | 5/1990 | Remick et al. |
| 4,983,472 A | 1/1991 | Katz et al. |
| 4,995,807 A | 2/1991 | Rampley et al. |
| 5,039,579 A | 8/1991 | Kinoshita |
| 5,071,719 A | 12/1991 | Rostrup-Nielsen et al. |
| 5,079,103 A | 1/1992 | Schramm |
| 5,082,752 A | 1/1992 | Koga et al. |
| 5,084,362 A | 1/1992 | Farooque |
| 5,100,743 A | 3/1992 | Narita et al. |
| 5,134,043 A | 7/1992 | Nakazawa |
| 5,169,717 A | 12/1992 | Topsoe |
| 5,198,311 A | 3/1993 | Nakazawa et al. |
| 5,208,113 A | 5/1993 | Kinoshita |
| 5,232,793 A | 8/1993 | Miyauchi et al. |
| 5,376,472 A | 12/1994 | Hartvigsen et al. |
| 5,380,600 A | 1/1995 | Hansen et al. |
| 5,413,878 A | 5/1995 | Williams et al. |
| 5,417,051 A | 5/1995 | Ankersmit et al. |
| 5,422,195 A | 6/1995 | Bernard |
| 5,468,573 A | 11/1995 | Bregoli et al. |
| 5,470,670 A | 11/1995 | Yasumoto et al. |
| 5,518,827 A | 5/1996 | Matsumura et al. |
| 5,541,014 A | 7/1996 | Micheli et al. |
| 5,554,453 A | 9/1996 | Steinfeld et al. |
| 5,616,430 A | 4/1997 | Aoyama |
| 5,660,941 A | 8/1997 | Farooque et al. |
| 5,688,292 A | 11/1997 | Antolini |
| 5,736,026 A | 4/1998 | Patel et al. |
| 5,833,734 A | 11/1998 | Cip et al. |
| 6,030,718 A | 2/2000 | Fuglevand et al. |
| 6,063,141 A | 5/2000 | Wendt et al. |
| 6,083,636 A | 7/2000 | Hsu |
| 6,090,312 A | 7/2000 | Ziaka et al. |
| 6,126,718 A | 10/2000 | Sawa et al. |
| 6,162,556 A | 12/2000 | Vollmar et al. |
| 6,267,799 B1 | 7/2001 | Innes et al. |
| 6,322,916 B1 | 11/2001 | Hemmes et al. |
| 6,365,290 B1 | 4/2002 | Ghezel-Ayagh et al. |
| 6,383,251 B1 | 5/2002 | Sherwood |
| 6,383,677 B1 | 5/2002 | Allen |
| 6,420,062 B1 | 7/2002 | Prohaska et al. |
| 6,492,045 B1 | 12/2002 | Blanchet et al. |
| 6,509,113 B2 | 1/2003 | Keegan |
| 6,524,356 B2 | 2/2003 | Fournier et al. |
| 6,648,942 B2 | 11/2003 | Hoffman et al. |
| 6,896,988 B2 | 5/2005 | Wang et al. |
| 7,311,986 B2 | 12/2007 | Hsu |
| 7,396,603 B2 | 7/2008 | Farooque et al. |
| 7,503,178 B2 | 3/2009 | Bucker et al. |
| 7,563,527 B2 | 7/2009 | Tanaka et al. |
| 7,855,028 B2 | 12/2010 | Ryu et al. |
| 7,862,938 B2 | 1/2011 | Ghezel-Ayagh |
| 7,914,765 B2 | 3/2011 | McLean et al. |
| 7,939,219 B2 | 5/2011 | Johnsen et al. |
| 8,047,007 B2 | 11/2011 | Zubrin et al. |
| 8,080,344 B2 | 12/2011 | Skok et al. |
| 8,142,943 B2 | 3/2012 | McElroy et al. |
| 8,349,504 B1 | 1/2013 | Radovich |
| 8,557,468 B2 | 10/2013 | Hilmi et al. |
| 8,562,903 B2 | 10/2013 | Hayton et al. |
| 8,802,332 B2 | 8/2014 | Correa et al. |
| 8,822,090 B2 | 9/2014 | Ma et al. |
| 8,882,865 B2 | 11/2014 | Johnston |
| 9,077,006 B2 | 7/2015 | Berlowitz et al. |
| 9,077,007 B2 | 7/2015 | Berlowitz et al. |
| 10,093,997 B2 | 10/2018 | Berlowitz et al. |
| 11,211,621 B2 | 12/2021 | Barckholtz et al. |
| 11,335,937 B2 | 5/2022 | Rosen et al. |
| 11,424,469 B2 | 8/2022 | Rosen et al. |
| 11,476,486 B2 | 10/2022 | Blanco Gutierrez et al. |
| 11,616,248 B2 | 3/2023 | Rosen et al. |
| 11,664,519 B2 | 5/2023 | Davis et al. |
| 11,695,122 B2 | 7/2023 | Hilmi et al. |
| 2002/0106549 A1 | 8/2002 | Cooper et al. |
| 2002/0142208 A1 | 10/2002 | Keefer et al. |
| 2002/0164522 A1 | 11/2002 | Huang et al. |
| 2003/0008183 A1 | 1/2003 | Hsu |
| 2003/0096155 A1 | 5/2003 | Hong et al. |
| 2003/0143448 A1 | 7/2003 | Keefer |
| 2003/0219637 A1 | 11/2003 | Coors |
| 2004/0038089 A1 | 2/2004 | Hoffjann et al. |
| 2004/0038115 A1 | 2/2004 | Johnsen et al. |
| 2004/0043274 A1 | 3/2004 | Scartozzi et al. |
| 2004/0170882 A1 | 9/2004 | Ohara et al. |
| 2004/0202914 A1 | 10/2004 | Sridhar et al. |
| 2005/0079395 A1 | 4/2005 | Varatharajan et al. |
| 2005/0106429 A1 | 5/2005 | Keefer |
| 2005/0112425 A1 | 5/2005 | Hsu |
| 2005/0123810 A1 | 6/2005 | Balan |
| 2005/0164051 A1 | 7/2005 | Venkataraman et al. |
| 2005/0181247 A1 | 8/2005 | Foger et al. |
| 2006/0123705 A1 | 6/2006 | Ma et al. |
| 2006/0127718 A1 | 6/2006 | Kurashima et al. |
| 2006/0159967 A1 | 7/2006 | Huijsmans et al. |
| 2006/0204806 A1 | 9/2006 | Takada et al. |
| 2006/0251940 A1 | 11/2006 | Bandhauer et al. |
| 2007/0017367 A1 | 1/2007 | McElroy et al. |
| 2007/0072027 A1 | 3/2007 | Sridhar et al. |
| 2007/0099038 A1 | 5/2007 | Galloway |
| 2007/0184310 A1 | 8/2007 | Kim et al. |
| 2007/0190395 A1 | 8/2007 | Ryu et al. |
| 2007/0224467 A1 | 9/2007 | Nervi et al. |
| 2007/0231659 A1* | 10/2007 | Ma ........................ H01M 8/026 429/510 |
| 2007/0287046 A1 | 12/2007 | Koda et al. |
| 2008/0057361 A1 | 3/2008 | Moon et al. |
| 2008/0124255 A1 | 5/2008 | Johnston |
| 2008/0160358 A1 | 7/2008 | Parodi et al. |
| 2009/0029204 A1 | 1/2009 | Venkataraman |
| 2009/0029205 A1 | 1/2009 | Venkataraman et al. |
| 2009/0042070 A1 | 2/2009 | Brown, Jr. et al. |
| 2009/0169452 A1 | 7/2009 | Constantz et al. |
| 2009/0208784 A1 | 8/2009 | Perry et al. |
| 2009/0317667 A2 | 12/2009 | Nervi et al. |
| 2009/0317669 A1 | 12/2009 | Hildebrandt et al. |
| 2010/0015486 A1 | 1/2010 | Yoshiba |
| 2010/0035109 A1 | 2/2010 | Weingaertner et al. |
| 2010/0148410 A1 | 6/2010 | Bleifuss et al. |
| 2010/0221633 A1 | 9/2010 | Fujita et al. |
| 2010/0239924 A1 | 9/2010 | McElroy et al. |

(56) References Cited

U.S. PATENT DOCUMENTS

| | | |
|---|---|---|
| 2011/0033771 A1 | 2/2011 | Bednarz et al. |
| 2011/0104577 A1 | 5/2011 | Cui et al. |
| 2011/0111315 A1 | 5/2011 | Cui et al. |
| 2011/0117460 A1 | 5/2011 | Shin |
| 2011/0154951 A1 | 6/2011 | Hiraoka |
| 2011/0167821 A1 | 7/2011 | Baker et al. |
| 2011/0171544 A1 | 7/2011 | Burmeister et al. |
| 2011/0223500 A1 | 9/2011 | Uematsu et al. |
| 2011/0223501 A1 | 9/2011 | Uematsu et al. |
| 2012/0028145 A1 | 2/2012 | Boden et al. |
| 2012/0171588 A1 | 7/2012 | Fan et al. |
| 2012/0214076 A1 | 8/2012 | Hakala |
| 2012/0251898 A1 | 10/2012 | Lehar et al. |
| 2012/0295180 A1 | 11/2012 | Homma |
| 2012/0325053 A1 | 12/2012 | Grossi |
| 2013/0014484 A1 | 1/2013 | Caprile et al. |
| 2013/0081516 A1 | 4/2013 | Simmons |
| 2013/0177824 A1 | 7/2013 | Cui et al. |
| 2013/0209904 A1 | 8/2013 | Liu et al. |
| 2013/0337360 A1 | 12/2013 | Mahoney et al. |
| 2014/0242482 A1 | 8/2014 | Cui et al. |
| 2014/0260310 A1 | 9/2014 | Berlowitz et al. |
| 2014/0272613 A1 | 9/2014 | Berlowitz et al. |
| 2014/0272616 A1 | 9/2014 | Berlowitz et al. |
| 2014/0272641 A1 | 9/2014 | Berlowitz et al. |
| 2015/0093665 A1 | 4/2015 | Barckholtz et al. |
| 2015/0280265 A1 | 10/2015 | McLarty |
| 2016/0168470 A1* | 6/2016 | Gillespie, III ............ B01J 3/042 201/1 |
| 2016/0190604 A1 | 6/2016 | Evans et al. |
| 2016/0190613 A1 | 6/2016 | Shiokawa et al. |
| 2017/0040620 A1 | 2/2017 | Uwani |
| 2017/0191139 A1 | 7/2017 | Berlowitz et al. |
| 2017/0271701 A1 | 9/2017 | Berlowitz et al. |
| 2017/0271707 A1 | 9/2017 | Sasakawa et al. |
| 2019/0051919 A1 | 2/2019 | Yoshizaki et al. |
| 2019/0131636 A1 | 5/2019 | Horst et al. |
| 2019/0198904 A1 | 6/2019 | Ichikawa et al. |
| 2019/0326614 A1* | 10/2019 | Hood .................. H01M 8/0258 |
| 2019/0386317 A1 | 12/2019 | Poizeau et al. |
| 2020/0020965 A1 | 1/2020 | Wang et al. |
| 2020/0099066 A1 | 3/2020 | Ghezel-Ayagh |
| 2020/0176783 A1 | 6/2020 | Rosen et al. |
| 2020/0176787 A1 | 6/2020 | Geary et al. |
| 2020/0176789 A1 | 6/2020 | Hilmi et al. |
| 2020/0176793 A1 | 6/2020 | Barckholtz et al. |
| 2020/0176795 A1 | 6/2020 | Johnson |
| 2020/0176799 A1 | 6/2020 | Blanco Gutierrez et al. |
| 2020/0176800 A1 | 6/2020 | O'Neal et al. |

FOREIGN PATENT DOCUMENTS

| | | |
|---|---|---|
| CA | 2551219 A1 | 1/2007 |
| CA | 2694153 A1 | 9/2011 |
| CN | 101098022 A | 1/2008 |
| CN | 101808723 A | 8/2010 |
| CN | 101821891 A | 9/2010 |
| CN | 201902241 U | 7/2011 |
| CN | 101796680 B | 10/2013 |
| CN | 105050945 A | 11/2015 |
| CN | 207542331 U | 6/2018 |
| DE | 40 05 468 A1 | 8/1991 |
| DE | 19515669 A1 | 10/1996 |
| DE | 19545186 A1 | 6/1997 |
| DE | 196 09 313 C1 | 9/1997 |
| DE | 199 41 724 A1 | 8/2000 |
| DE | 100 16 847 A1 | 10/2001 |
| DE | 10 2006 047 823 A1 | 2/2008 |
| DE | 10 2008 019 981 A1 | 10/2009 |
| EP | 0 170 277 A2 | 2/1986 |
| EP | 0 180 941 A2 | 5/1986 |
| EP | 0 473 153 A2 | 3/1992 |
| EP | 0 502 125 A1 | 9/1992 |
| EP | 0 678 926 A1 | 10/1995 |
| EP | 0 685 897 A1 | 12/1995 |
| EP | 0 691 701 A1 | 1/1996 |
| EP | 1 670 090 A1 | 6/2006 |
| EP | 1 926 171 A1 | 5/2008 |
| EP | 2 182 572 A1 | 5/2010 |
| EP | 2 991 139 A1 | 3/2016 |
| JP | S56-69775 A | 6/1981 |
| JP | S58-093170 A | 6/1983 |
| JP | H02-075164 A | 3/1990 |
| JP | H03-001447 A | 1/1991 |
| JP | H03-210774 A | 9/1991 |
| JP | H04-039868 A | 2/1992 |
| JP | H05-029009 A | 2/1993 |
| JP | H05-163180 A | 6/1993 |
| JP | H05-503606 A | 6/1993 |
| JP | H05-325996 A | 12/1993 |
| JP | H06-196184 A | 7/1994 |
| JP | H07-302604 A | 11/1995 |
| JP | H08-96824 A | 4/1996 |
| JP | H08-138701 A | 5/1996 |
| JP | H10-172595 A | 6/1998 |
| JP | H11-91427 A | 4/1999 |
| JP | H11-312527 A | 11/1999 |
| JP | 2002-151111 A | 5/2002 |
| JP | 2002-319428 A | 10/2002 |
| JP | 2004-014124 A | 1/2004 |
| JP | 2004-079495 A | 3/2004 |
| JP | 2004-186074 A | 7/2004 |
| JP | 2004-523086 A | 7/2004 |
| JP | 2005-190981 A | 7/2005 |
| JP | 2006-073316 A | 3/2006 |
| JP | 2007-52937 A | 3/2007 |
| JP | 2007-179910 A | 7/2007 |
| JP | 2007-214134 A | 8/2007 |
| JP | 2007-287580 A | 11/2007 |
| JP | 2008-527617 A | 7/2008 |
| JP | 2008-192425 A | 8/2008 |
| JP | 2008-287940 A | 11/2008 |
| JP | 2009-043487 A | 2/2009 |
| JP | 2010-534913 A | 11/2010 |
| JP | 2013-045535 A1 | 3/2013 |
| JP | 2016-511525 A | 4/2016 |
| JP | 2016-517616 A | 6/2016 |
| JP | 2016-532243 A | 10/2016 |
| JP | 2018-521464 A | 8/2018 |
| JP | 2019-508860 A | 3/2019 |
| JP | 7286769 B2 | 6/2023 |
| KR | 2006-0057023 A | 5/2006 |
| KR | 10-0651270 B1 | 11/2006 |
| KR | 1020080017402 A | 2/2008 |
| KR | 10-0827954 B1 | 5/2008 |
| KR | 2009-0067426 A | 6/2009 |
| KR | 2009-0124824 A | 12/2009 |
| KR | 2010-0032974 A | 3/2010 |
| KR | 2011-0029963 A | 3/2011 |
| KR | 2011-0032443 A | 3/2011 |
| KR | 2011-0077775 A | 7/2011 |
| KR | 2012-0050319 A | 5/2012 |
| KR | 10-2013-0128116 A | 11/2013 |
| KR | 2014-0085839 A | 7/2014 |
| KR | 2015-0066314 A | 6/2015 |
| KR | 2016-0041309 A | 4/2016 |
| NL | 1008883 C2 | 10/1999 |
| TW | 201036239 A | 10/2010 |
| WO | 91/08595 A1 | 6/1991 |
| WO | 97/21257 A2 | 6/1997 |
| WO | 97/33828 A1 | 9/1997 |
| WO | 00/31815 A1 | 6/2000 |
| WO | 02/069430 A2 | 9/2002 |
| WO | 02/070402 A2 | 9/2002 |
| WO | 2002/103833 A1 | 12/2002 |
| WO | 2003/063276 A2 | 7/2003 |
| WO | 2004/013924 A2 | 2/2004 |
| WO | 2005/001977 A1 | 1/2005 |
| WO | 2006/072262 A1 | 7/2006 |
| WO | 2008/036169 A2 | 3/2008 |
| WO | 2010/044113 A1 | 4/2010 |
| WO | 2010/067223 A1 | 6/2010 |
| WO | 2010/125443 A1 | 11/2010 |

(56) References Cited

FOREIGN PATENT DOCUMENTS

| WO | 2010/147885 A1 | 12/2010 |
|---|---|---|
| WO | 2010/147886 A1 | 12/2010 |
| WO | 2011/077224 A1 | 6/2011 |
| WO | 2012/091096 A1 | 7/2012 |
| WO | 2012/128928 A1 | 9/2012 |
| WO | 2012/176176 A1 | 12/2012 |
| WO | 2012/176177 A1 | 12/2012 |
| WO | 2016/196952 A1 | 12/2016 |
| WO | 2017/160511 A1 | 9/2017 |
| WO | 2017/223218 A1 | 12/2017 |
| WO | 2018/222265 A1 | 12/2018 |
| WO | 2021/107929 A1 | 6/2021 |

OTHER PUBLICATIONS

"Lower and Higher Heating Values of Fuels", Hydrogen Data Resource Center: Hydrogen Calculator, p. 1 (2012).
"Molten Carbonate Fuel Cell Technology", Fossil Energy—U.S. Department of Energy, pp. 2 (Jan. 31, 2011).
"Test and Quality Assurance Plan : FuelCell Energy, Inc.—DFC 300A Molten Carbonate Fuel Cell Combined Heat and Power System", Greenhouse Gas Technology Center, pp. 1-42 (Mar. 2007).
Avidan, A. A., "Gasoline and Distillate Fuels from Methanol", Elsevier Science Publishers B.V, pp. 307-323 (1988).
Appleby A. J., and Selman, J. R., "Current Technology of PAFC, MCFC and SOFC Systems: Status of Present Fuel Cell Power Plants", Electrochemical Hydrogen Technologies, pp. 425-495 (Jan. 1, 1990).
Appleby, A. J., "Fuel Cells and Hydrogen Fuel", International Journal of Hydrogen Energy, vol. 19, No. 2, pp. 175-180 (1994).
Amorelli, A., et al., "An experimental investigation into the use of molten carbonate fuel cells to capture CO2 from gas turbine exhaust gases", Second annual conference on Carbon Sequestration, pp. 1-9 (May 5-8, 2003).
Amorelli, A., et al., "An experimental investigation into the use of molten carbonate fuel cells to capture CO2 from gas turbine exhaust gases", Energy, vol. 29, pp. 1279-1284 (2004).
Abu-Zahra, M. R.M, et al.,"CO2 capture from power plants: Part I. A parametric study of the technical performance based on monoethanolamine", International Journal of Greenhouse Gas Control, vol. 1, pp. 37-46 (2007).
Appl, M., "Ammonia, 3. Production Plants", Ullmann's Encyclopedia of Industrial Chemistry, vol. 3, pp. 1-35 (2012).
Bianchi A., et al., "Bimodal Pore Size Distribution in MCFC Cathode Structure", Extended Abstracts, Electrochemical Society, vol. 95/01, pp. 858-859 (May 1995).
Cavallaro, S., et al., "Syngas and electricity production by an integrated autothermal reforming/molten carbonate fuel cell system", Journal of Power Sources, vol. 76, pp. 190-196 (1998).
Chiesa, P., et al., "A Comparative Analysis of IGCCs with CO2 Sequestration", Greenhouse Gas Control Technologies, pp. 107-112 (1999).
Campanari, S., "Carbon Dioxide separation from high temperature fuel cell power plants", Journal of Power Sources, vol. 112, pp. 273-289 (2002).
Campanari, S., et al., "CO2 capture from combined cycles integrated with Molten Carbonate Fuel Cells", International Journal of Greenhouse Gas Control, vol. 4, pp. 441-451 (2010).
Campanari, S., et al., "Application of MCFCs for active CO2 capture within natural gas combined cycles", Energy Procedia, vol. 4, pp. 1235-1242 (2011).
Caprile, L., et al., "Carbon capture: Energy wasting technologies or the MCFCs challenge?", International Journal of Hydrogen Energy, vol. 36, pp. 10269-10277 (2011).
Chiesa, P., et al., "CO2 cryogenic separation from combined cycles integrated with molten carbonate fuel cells", International Journal of Hydrogen Energy, vol. 36, pp. 10355-10365 (2011).
Desideri, U., et al., "MCFC-based CO2 capture system for small scale CHP plants", International Journal of Hydrogen Energy, vol. 37, pp. 19295-19303 (2012).
Ghezel-Ayagh, H., "High Efficiency Direct FuelCell/Turbine® Power Plant", Project Fact Sheet, Fuel Cell Energy, pp. 3 (2011).
Ghezel Ayagh, H., "Electrochemical Membrane for CO2 Capture and Power Generation", Presentation at the 2012 NETL CO2 Capture Technology Meeting, Fuel Cell Energy, pp. 12 (Jul. 9, 2012).
Giddey, S., et al., "A comprehensive review of direct carbon fuel cell technology", Progress in Energy Combustion Science, vol. 38, pp. 360-399 (2012).
Keil, F. J., "Methanol-to-hydrocarbons: process technology", Microporous and Mesoporous Materials, vol. 29, pp. 49-66 (1999).
Kim, D. H., et al., "Numerical studies of a separator for stack temperature control in a molten carbonate fuel cell", International Journal of Hydrogen Energy, vol. 36, pp. 8499-8507 (2011).
Lowe, C., et al., "Technology Assessment of Hydrogen Firing of Process Heaters", Energy Procedia, ScienceDirect, vol. 4, pp. 1058-1065 (2011).
Morita, H., et al., "Degradation Mechanism of Molten Carbonate Fuel Cell Based on Long-Term Performance: Long-Term Operation by Using Bench-Scale Cell and Post-Test Analysis of the Cell", Journal of Power Sources, vol. 195, pp. 6988-6996 (2010).
Manzolini, G., et al., "CO2 Separation from Combined Cycles Using Molten Carbonate Fuel Cells", Journal of Fuel Cell Science and Technology, vol. 9, pp. 011018-1 to 011018-8 (2012).
Naqvi, S. N., "Dimethyl Ether As Fuel", SRI Consulting Report, Report No. 245A, pp. 188 (Sep. 2005).
Pilatowsky, I., et al., "Thermodynamics Of Fuel Cells", Cogeneration Fuel Cell-Sorption Air Conditioning Systems, pp. 25-36 (2011).
Sugiura, K., et al., "The carbon dioxide concentrator by using MCFC", Journal of Power Sources, vol. 118, pp. 218-227 (2003).
Steynberg, A., "Gas loop for POX reformers : Figure 8", Studies in Surface Science and Catalysis: Fischer Tropsch Technology, vol. 152, pp. 8 (2004).
Verda, V., and Nicolin, F., "Thermodynamic and economic optimization of a MCFC-based hybrid system for the combined production of electricity and hydrogen", International Journal of Hydrogen Energy, vol. 35, pp. 794-806 (2010).
Wesoff, E., "Will FuelCell Energy Be The First Profitable Company In The Industry?", Greentech Media, pp. 3 (Dec. 15, 2011).
Zhou, W., et al., "Decrease of energy demand for bioethanol-based polygeneration system through case study", Applied Energy, vol. 95, pp. 305-311 (2012).
International Search Report and Written Opinion received for PCT Patent Application No. PCT/US2019/063296, dated Feb. 18, 2020, 11 pages.
International Search Report and Written Opinion received for PCT Patent Application No. PCT/US2019/063255, dated Mar. 4, 2020, 11 pages.
International Search Report and Written opinion received for PCT Patent Application No. PCT/US2019/063293, dated Mar. 13, 2020, 10 pages.
International Search Report and Written Opinion received for PCT Patent Application No. PCT/US2019/063301, dated Mar. 13, 2020, 9 pages.
International Search Report and Written Opinion received for PCT Patent Application No. PCT/US2019/063248, dated Mar. 13, 2020, 10 pages.
International Search Report and Written Opinion received for PCT Patent Application No. PCT/US2019/063434, dated Mar. 24, 2020, 11 pages.
International Search Report and Written Opinion received for PCT Patent Application No. PCT/US2019/063337, dated Mar. 31, 2020, 9 pages.
International Search Report and Written Opinion received for PCT Patent Application No. PCT/US2019/063304, dated Apr. 1, 2020, 11 pages.
International Search Report and Written Opinion received for PCT Patent Application No. PCT/US2019/063291, dated Aug. 18, 2020, 13 pages.

(56) References Cited

OTHER PUBLICATIONS

International Search Report and Written Opinion received for PCT Patent Application No. PCT/US2019/063345, dated Aug. 20, 2020, 13 pages.
International Search Report and Written Opinion received for PCT Patent Application No. PCT/US2019/063333, dated Nov. 25, 2020, 20 pages.
Restriction Requirement dated Feb. 22, 2021 in U.S. Appl. No. 16/695,276, 7 pages.
Restriction Requirement dated Feb. 25, 2021 in U.S. Appl. No. 16/695,335, 7 pages.
Restriction Requirement dated Feb. 25, 2021 in U.S. Appl. No. 16/695,356, 8 pages.
Restriction Requirement dated Mar. 3, 2021 in U.S. Appl. No. 16/695,281, 6 pages.
International Search Report and Written Opinion received for PCT Patent Application No. PCT/2021/020838, dated Feb. 7, 2022, 25 pages.
Canadian Office Action received for Canadian Patent Application No. 3162614, mailed on May 23, 2023, 3 pages.
Office Action received for European Patent Application No. 19827916.8, mailed on May 25, 2023, 5 pages.
Notification of Allowance and Search received for Chinese Patent Application No. 201980087107.5, mailed on May 29, 2023, 7 pages. (English translation submitted).
Notification of Allowance and Search received for Chinese Patent Application No. 201980090518.X, mailed on May 29, 2023, 7 pages. (English translation submitted).
Non-Final Office Action dated Jun. 14, 2023 in U.S. Appl. No. 16/695,276, 14 pages.
Office Action received in Japanese Patent Application No. 2022-530718 mailed on Jun. 13, 2023, 8 pages. (English Translation submitted).
Search Report received for Japanese Patent Application No. 2022-530259, mailed on May 15, 2023, 23 pages. (English translation submitted).
Office Action received in Korean Patent Application No. 2021-7020267 mailed on Jun. 15, 2023, 14 pages. (English Translation submitted).
Office Action received in Japanese Patent Application No. 2022-530808 mailed on Jun. 20, 2023, 10 pages. (English Translation submitted).
Notice of Acceptance received for Australian Patent Application No. 2019476316, mailed on Aug. 1, 2023, 3 pages.
Notice of Allowance dated Aug. 2, 2023 in U.S. Appl. No. 17/941,291, 13 pages.
Non-Final Office Action dated Aug. 16, 2023 in U.S. Appl. No. 16/695,362, 14 pages.
Non-Final Office Action dated Sep. 6, 2023 in U.S. Appl. No. 18/110,097, 16 pages.
Notice of Allowance dated Sep. 7, 2023 in U.S. Appl. No. 16/695,281, 11 pages.
Second Examination Report received for Australian Patent Application No. 2019476338, mailed on Sep. 13, 2023, 4 pages.
Office Action and Search received for Chinese Patent Application No. 201980102537.X, mailed on Jul. 29, 2023, 20 pages. (English translation submitted).
Notice of Allowance dated Sep. 20, 2023 in U.S. Appl. No. 17/677,363, 12 pages.
First Office Action and Search received for Chinese Patent Application No. 201980102582.5, mailed on Aug. 4, 2023, 11 pages. (English translation submitted).
First Office Action and Search received for Chinese Patent Application No. 201980078699.4, mailed on Aug. 16, 2023, 23 pages. (English translation submitted).
Notice of Acceptance received for Australian Patent Application No. 2019476660, mailed on Aug. 31, 2023, 3 pages.
First Office Action and Search received for Chinese Patent Application No. 201980102495.X, mailed on Aug. 30, 2023, 13 pages. (English translation submitted).

Canadian Office Action received for Canadian Patent Application No. 3162231, mailed on Oct. 17, 2023, 3 pages.
Non-Final Office Action dated Nov. 22, 2023 in U.S. Appl. No. 16/695,280, 17 pages.
Notice of Allowance received for Korean Patent Application No. 2021-7020267, mailed on Nov. 3, 2023, 6 pages. (English translation submitted).
Invitation to pay additional fees received for PCT Patent Application No. PCT/US2021/020838, mailed on Nov. 5, 2021, 14 pages.
Office Action and Search received for Chinese Patent Application No. 201980078515.4, mailed on Oct. 21, 2023, 17 pages. [English Translation Submitted].
Non-Final Office Action dated Mar. 16, 2022 in U.S. Appl. No. 16/695,362, 11 pages.
Notice of Allowance dated Apr. 19, 2022 in U.S. Appl. No. 16/695,349, 9 pages.
Canadian Office Action received for Canadian Patent Application No. 3121537, mailed on Mar. 21, 2022, 4 pages.
Canadian Office Action received for Canadian Patent Application No. 3121538, mailed on Mar. 21, 2022, 4 pages.
Non-Final Office Action dated May 10, 2022 in U.S. Appl. No. 16/696,821, 8 pages.
Invitation to Pay Additional Fee received for PCT Application No. PCT/US2019/063333, mailed on Aug. 18, 2020, 9 pages.
Notice of Allowance dated Jun. 10, 2022 in U.S. Appl. No. 16/695,286, 11 pages.
Notice of Reasons for Refusal and Search Report received in JP Patent Application No. 2021-531318, mailed on May 31, 2022, 43 pages.(English Translation Submitted).
Notice of Reasons for Refusal and Search Report received in JP Patent Application No. 2021-531317, mailed on May 31, 2022, 38 pages.(English Translation Submitted).
Final Office Action dated Jul. 25, 2022 in U.S. Appl. No. 16/695,278, 19 pages.
Final Office Action dated Jul. 27, 2022 in U.S. Appl. No. 16/695,280, 17 pages.
Non-Final Office Action dated Jul. 29, 2022 in U.S. Appl. No. 16/695,281, 14 pages.
Notice of Allowance dated Sep. 8, 2022 in U.S. Appl. No. 16/695,276, 7 pages.
Final Office Action dated Sep. 21, 2022 in U.S. Appl. No. 16/695,362, 12 pages.
Notice of Reasons for Refusal received in JP Patent Application No. 2021-531318, mailed on Oct. 4, 2022, 8 pages.(English Translation Submitted).
Notice of Allowance dated Oct. 27, 2022 in U.S. Appl. No. 16/696,821, 12 pages.
Notice of Allowance dated Nov. 16, 2022 in U.S. Appl. No. 17/867,324, 8 pages.
Decision to Grant received in JP Patent Application No. 2021-531317, mailed on Nov. 29, 2022, 5 pages. (English Translation Submitted).
Final Office Action dated Jan. 3, 2023 in U.S. Appl. No. 16/695,276, 11 pages.
Canadian Office Action received for Canadian Patent Application No. 3121537, mailed on Jan. 9, 2023, 3 pages.
Notice of Allowance dated Jan. 18, 2023 in U.S. Appl. No. 16/695,368, 7 pages.
Non-Final Office Action dated Jan. 17, 2023 in U.S. Appl. No. 17/941,291, 11 pages.
First Examination Report received for Australian Patent Application No. 2019476316, mailed on Jan. 25, 2023, 2 pages.
Notice of Allowance dated Feb. 1, 2023 in U.S. Appl. No. 16/695,278, 8 pages.
"20 Mesh T316 Stainless .009" Wire DIA, TWP Inc., accessed at https://www.twpinc.com/20-mesh-t316-stainless-009-wire-dia, accessed on Jan. 4, 2023, 2 pages.
Campanari, S., et al., "Using MCFC for high efficiency $CO_2$ capture from natural gas combined cycles: Comparison of internal and external reforming," Applied Energy, 112, pp. 772-783, 2013 (Year: 2013).
Non-Final Office Action dated Aug. 3, 2021 in U.S. Appl. No. 16/695,276, 17 pages.

(56) References Cited

OTHER PUBLICATIONS

Non-Final Office Action dated Jun. 16, 2021 in U.S. Appl. No. 16/695,356, 5 pages.
Non-Final Office Action dated Jul. 22, 2021 in U.S. Appl. No. 16/695,368, 8 pages.
Non-Final Office Action dated Aug. 10, 2021 in U.S. Appl. No. 16/695,281, 15 pages.
Notice of Allowance dated Aug. 17, 2021 in U.S. Appl. No. 16/695,335, 12 pages.
Final Office Action dated Jan. 11, 2022 in U.S. Appl. No. 16/695,276, 17 pages.
Final Office Action dated Nov. 15, 2021 in U.S. Appl. No. 16/695,368, 5 pages.
Notice of Allowance dated Nov. 23, 2021 in U.S. Appl. No. 16/695,356, 15 pages.
Final Office Action dated Dec. 21, 2021 in U.S. Appl. No. 16/695,281, 12 pages.
Non-Final Office Action dated Jan. 7, 2022 in U.S. Appl. No. 16/695,286, 6 pages.
Non-Final Office Action dated Jan. 20, 2022 in U.S. Appl. No. 16/695,280, 17 pages.
Non-Final Office Action dated Feb. 4, 2022 in U.S. Appl. No. 16/695,278, 18 pages.
Notice of Allowance dated Feb. 11, 2022 in U.S. Appl. No. 16/695,368, 7 pages.
Office Action received for Canadian Patent Application No. 3159772, mailed on Feb. 23, 2023, 3 pages.
Non-Final Office Action dated Apr. 14, 2023 in U.S. Appl. No. 16/695,281, 13 pages.
Notice of Allowance received for Canadian Patent Application No. 3121538, mailed on Mar. 7, 2023, 1 page.
Canadian Office Action received for Canadian Patent Application No. 3162231, mailed on Mar. 16, 2023, 3 pages.
Non-Final Office Action dated Apr. 18, 2023 in U.S. Appl. No. 17/677,363, 8 pages.
First Examination Report received for Australian Patent Application No. 2019476660, mailed on Mar. 17, 2023, 3 pages.
First Examination Report received for Australian Patent Application No. 2019476338, mailed on Apr. 14, 2023, 4 pages.
Decision to Grant received in JP Patent Application No. 2021-531318, mailed on Apr. 25, 2023, 5 pages. (English Translation submitted).
Non-Final Office Action dated May 12, 2023 in U.S. Appl. No. 16/695,280, 16 pages.
Office Action and Search Report received for Japanese Patent Application No. 2022-530259, mailed on Jun. 20, 2023, 31 pages. (English translation submitted).
Office Action received for Korean Patent Application No. 10-2021-7020275, mailed on May 18, 2023, 18 pages. (English translation submitted).
Office Action received in Japanese Patent Application No. 2022-530718 mailed on Dec. 5, 2023, 5 pages. [English Translation submitted].
Notice of Allowance received for Canadian Patent Application No. 3121537, mailed on Oct. 27, 2023, 1 page.

\* cited by examiner

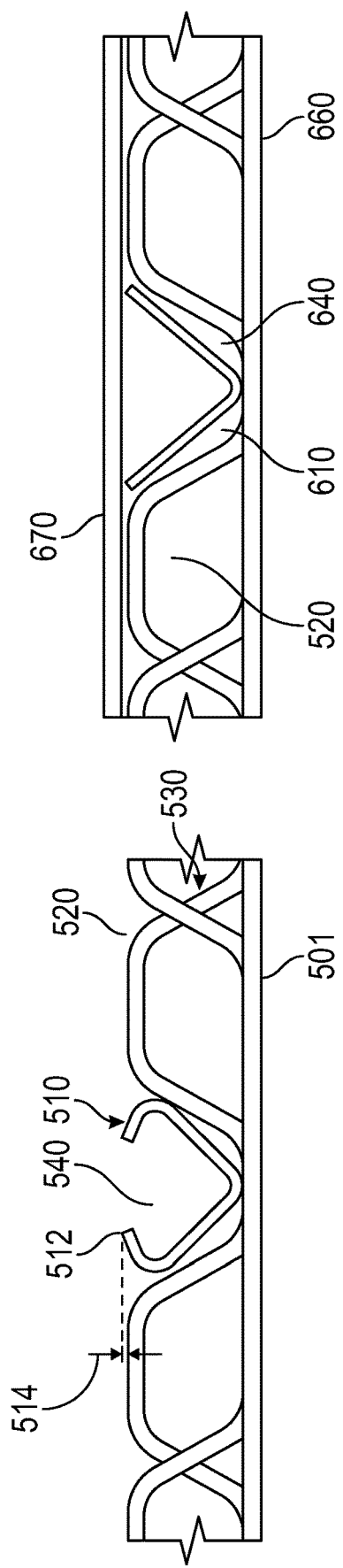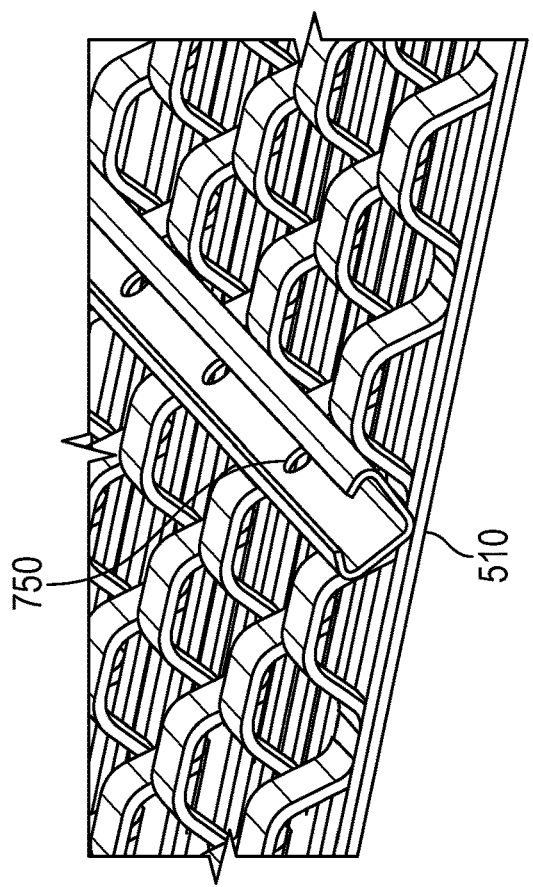
FIG. 5
FIG. 6
FIG. 7

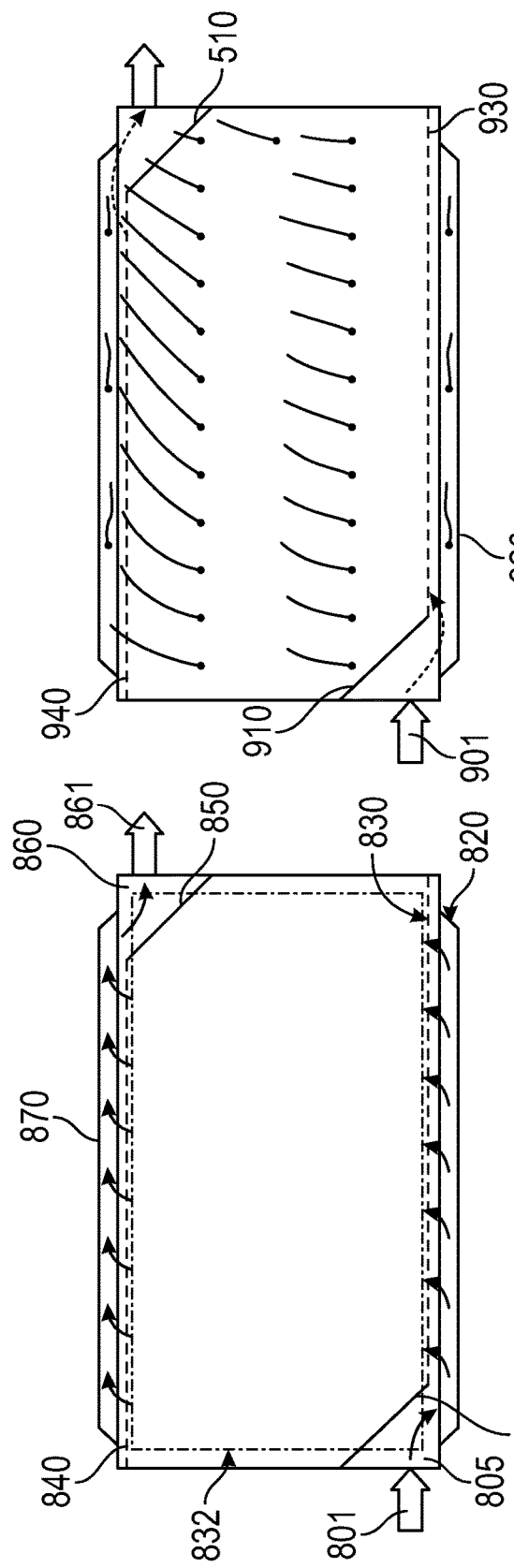
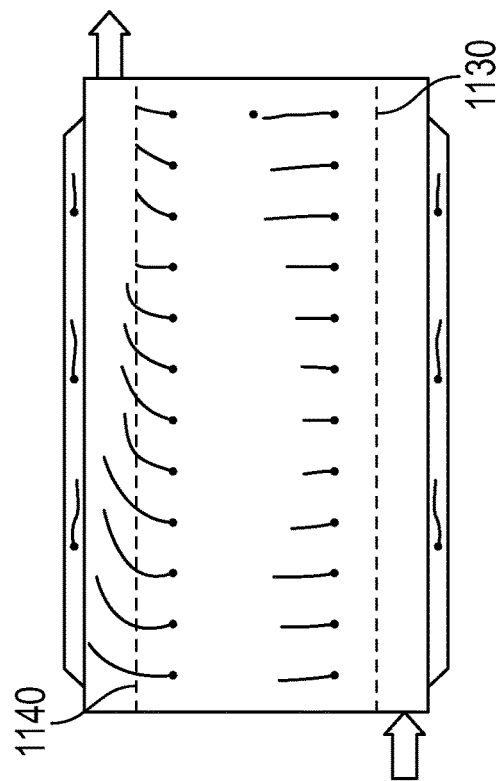
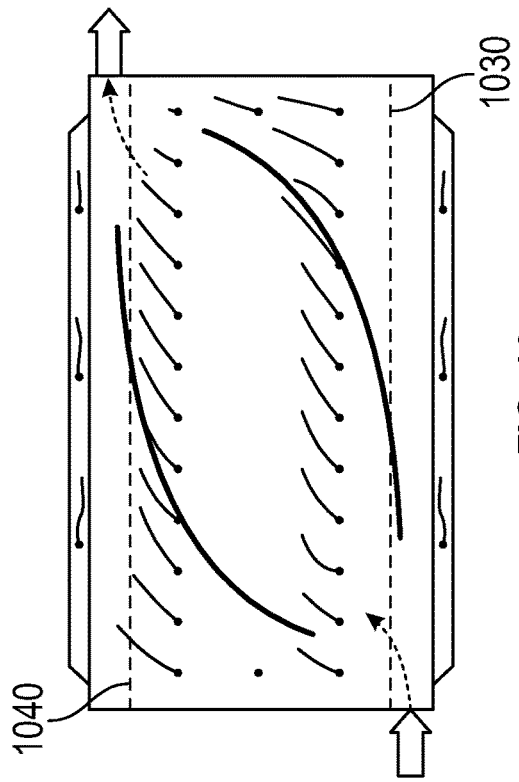

FLOW BAFFLE FOR MOLTEN CARBONATE FUEL CELL

STATEMENT REGARDING JOINT RESEARCH AGREEMENT

ExxonMobil Research and Engineering Company and FuelCell Energy, Inc. are parties to a joint research agreement.

CROSS-REFERENCE TO RELATED APPLICATIONS

None

FIELD OF THE INVENTION

Baffle structures for a molten carbonate fuel cell are provided, along with methods of operating such a fuel cell.

BACKGROUND OF THE INVENTION

A conventional fuel cell stack assembly may be formed with a plurality of fuel cells, each with an anode layer and a cathode layer separated by an electrolyte layer. The plurality of fuel cells may be arranged to form a stack of fuel cells. Each anode layer includes an anode inlet (i.e., one face of the stack of fuel cells) and an opposing anode outlet (i.e., an opposite face of the stack), and anode feed gas passes through the anode layers from the anode inlet to the anode outlet in a first direction. Similarly, each cathode layer includes a cathode inlet (i.e., another face of the stack) and an opposing cathode outlet (i.e., an opposite face of the stack), and cathode feed gas passes through the cathode layers from the cathode inlet to the cathode outlet in a second direction, which is perpendicular to the first direction. The perpendicular flow of the anode feed gas and the cathode feed gas generates a two-dimensional distribution of current within the fuel cell. For example, the current may be highest in a corner proximate both the anode inlet and the cathode inlet (due to increased gas concentrations) and may be lowest in a corner proximate the anode outlet and the cathode outlet (due to decreased electrochemical activity). The two-dimensional distribution of current then varies in both the first direction and the second direction, making it difficult to optimize the flow of the anode and cathode feed gases to reduce variance in the current across each fuel cell.

The standard perpendicular flow, or cross flow, configuration produces a two-dimensional current across the cell surface, which in turn induces a two-dimensional thermal gradient. This thermal gradient, with one corner colder than the average temperature of the flow field and another corner hotter than the average temperature of the flow field, is problematic when many cells are stacked due to differential thermal expansion. The hot corner/side grows more than the cold corner/side resulting in stack distortion, tilting, and bending because the cells are no longer planar. This distortion can also induce contact loss, and vary the amount of local compression on different areas of the cell. The taller the stack, the more this effect comes into play. It would be advantageous to provide a fuel cell assembly that provides anode feed gas and cathode feed gas flowing in parallel directions in order to provide a one-dimensional distribution of current and, thus, a one-dimensional temperature gradient. If achieved, the cells within the stack will remain substantially planar, resulting in better contact, more predictable movement, and less challenges with maintaining uniform stack compression U.S. Pat. No. 6,509,113 describes a baffle for use in an electrode of a solid oxide fuel cell. The baffle is described as reducing the amount of fuel that is able to access the anode when the fuel concentration is at a maximum, while allowing maximum exposure of fuel to the anode when fuel concentration is at a minimum.

U.S. Patent Application Publication 2020/0176787 describes a flow field baffle for a cathode in a molten carbonate fuel cell.

SUMMARY OF THE INVENTION

In various aspects, an element in a molten carbonate fuel cell stack that includes a baffle provided. The fuel cell stack element includes a gas flow inlet. The fuel cell stack element further includes a first volume in fluid communication with the gas flow inlet. The fuel cell stack element further includes a second volume, the second volume including at least a portion of an anode active area of a fuel cell anode, at least a portion of a cathode active area of a fuel cell cathode, or reforming catalyst. The second volume can be in fluid communication with the gas flow inlet via the first volume. The fuel cell stack element further includes an inlet baffle comprising a plurality of inlet baffle apertures at an inlet boundary between the first volume and the second volume. At least a portion of the fluid communication between the first volume and the second volume can correspond to fluid flow through the plurality of inlet baffle apertures. A length of the inlet baffle can be at least 60% of a length of the inlet boundary. An average height of the inlet baffle ca be 100% or more of an average height along the inlet boundary. A combined cross-sectional area of the plurality of inlet baffle apertures can be 0.5% to 6.0% of a total cross-sectional area at the inlet boundary. Additionally, the fuel cell stack element can include a gas flow outlet in fluid communication with the second volume.

In some aspects, the fuel cell stack element can correspond to an anode or a cathode of a molten carbonate fuel cell. In such aspects, the first volume can correspond to at least a portion of a volume in an extended edge wet seal chamber. In such aspects, the second volume can correspond to at least a portion of an anode active area and associated anode flow field, or at least a portion of a cathode active area and associated flow field. In some aspects, the fuel cell stack element can correspond to a reforming element, where the second volume includes reforming catalyst.

Methods for operating a fuel cell stack containing such a fuel cell stack element are also provided.

BRIEF DESCRIPTION OF THE FIGURES

FIG. 5 shows a side view of an example of a baffle structure.

FIG. 6 shows a side view of another example of a baffle structure.

FIG. 7 shows a perspective view of an example of a baffle structure.

FIG. 8 shows a top view of a fuel cell with an extended wet seal and a desired flow pattern for the anode gas flow.

FIG. 9 shows anode gas flow direction in an anode with the use of a baffle structure.

FIG. 10 shows anode gas flow direction in an anode with a comparative baffle configuration.

FIG. 11 shows anode gas flow direction in an anode with another comparative baffle configuration.

DETAILED DESCRIPTION OF THE EMBODIMENTS

Overview

Figure 1:
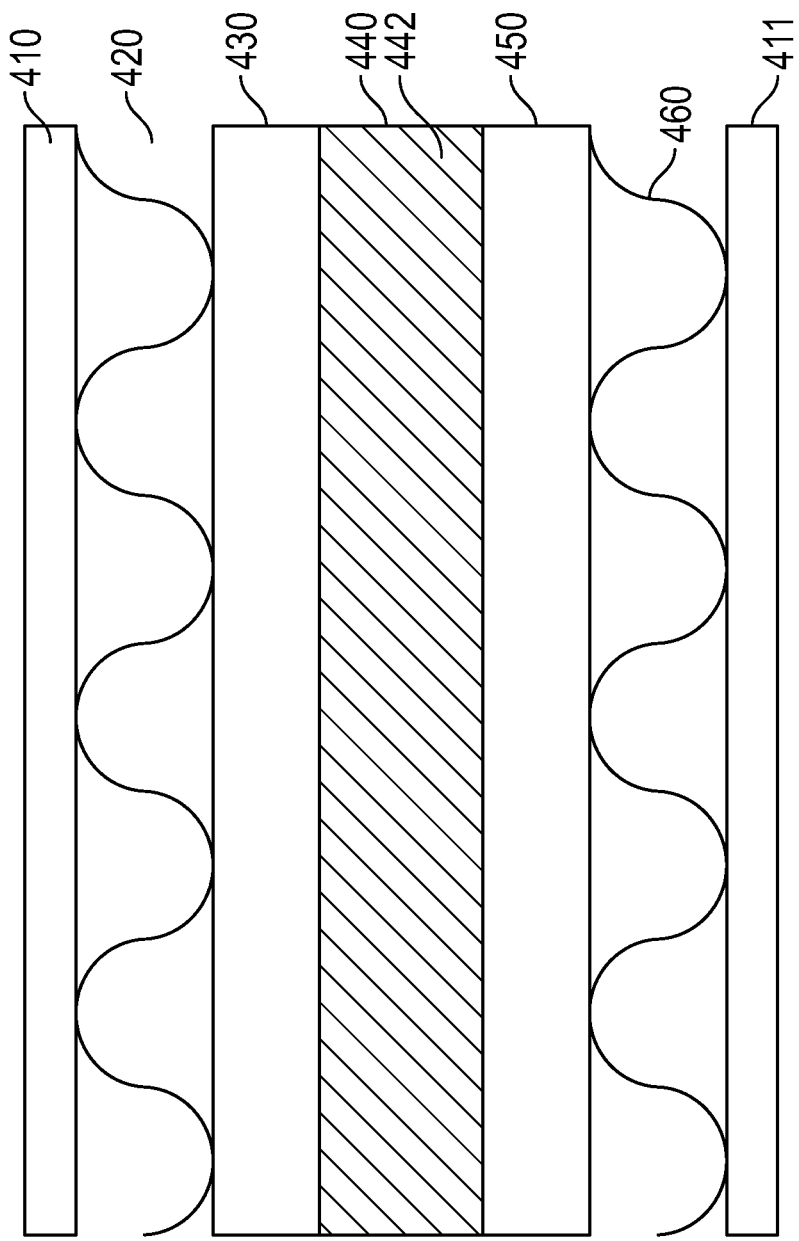
FIG. 1 is a schematic of a fuel cell.

In various aspects, molten carbonate fuel cell configurations are provided that allow for introduction of an anode input gas flow on a side of the fuel cell that is adjacent to the entry side for the cathode input gas flow while allowing the anode and cathode to operate under co-current flow and/or counter-current flow conditions. It has been discovered that improved flow properties can be achieved within the anode during co-current flow or counter-current flow operation by diverting the anode input flow into an extended edge seal region (in an extended edge seal chamber) adjacent to the active area of the anode, and then using a baffle to provide sufficient pressure drop for even flow distribution of the anode input flow across the anode. A second baffle can be used to create a pressure drop as the anode output flow exits from the active area into a second extended edge seal region (in a second extended edge seal chamber), prior to the anode output flow leaving the fuel cell. A similar arrangement could be used to manage the cathode input flow and cathode output flow, if desired.

Additionally, it has further been discovered that when using baffles to manage pressure drop between extended edge seal volumes, it is beneficial to use a solid baffle that blocks substantially the entire flow field, but includes apertures or perforations that allow flow of gas across the baffle. This is in contrast to a conventional baffle configuration, where the pressure drop would be controlled based on a gap between the baffle and the top or bottom of the flow field. It has been discovered that due to the sensitivity of the pressure drop to minor manufacturing tolerance variations, improved control over the pressure drop can be achieved by using apertures rather than relying on a gap between surfaces.

Optionally, for the input flow, an increased amount of available flow field can be provided at an end of the baffle that is farthest away from the location where the anode input gas flow enters the input extended edge seal volume. This increased amount of available flow field can be due to using larger apertures near the far end of the baffle and/or by using a baffle that does not extend the full length of the flow field (such as a baffle that is shorter than the length of the flow field by up to 5% of the length). Optionally, for the output flow, an increased amount of available flow field can be provided at an end of the baffle that is farthest away from where the anode output gas flow exits from the output extended edge seal volume.

In still further aspects, baffles can also be used to manage flow into reforming units that are integrated as elements in a fuel cell stack. In such aspects, a reforming unit can be integrated as a stack element in the fuel cell stack on a periodic basis, such as having one reforming unit per three or more fuel cells, or one reforming unit per five or more fuel cells, such as down to one reforming unit per twenty fuel cells or possibly still less. Integrating a reforming unit into a fuel cell stack can allow excess heat generated during fuel cell operation to be at least partially consumed by performing reforming in an adjacent and/or nearby element in the fuel cell stack. In such aspects, the baffles can be used to adjust the flow pattern in the reforming unit, so that the heat consumption pattern in the reforming unit is relatively similar to the heat generation pattern in the adjacent and/or nearby fuel cell elements in the stack.

For fuel cell stacks, one option for managing the gas flows into and out of the stack is to use manifolds. Due to practical considerations, it can be beneficial to have the manifolds for the anode input and anode output flows physical separated from the manifolds for the cathode input and cathode input flows. For a fuel cell stack with a roughly rectangular or square geometry, a convenient method of physically separating the manifolds can be to locate the manifolds for the anode input flow and anode output flow on different sides of the fuel cell stack from the manifold for the cathode input flow (and the manifold for the cathode output flow, if one is present). While this type of configuration can reduce or minimize geometric difficulties in connecting the manifolds to the fuel cell stack, this can result in the direction of flow in the anode being roughly perpendicular, or cross-flow, relative to the direction of flow in the cathode. Unfortunately, under some operating conditions, operating a fuel cell in a cross-flow configuration can lead to non-uniformity of reaction conditions within the fuel cell. This can potentially pose mechanical problems and/or fuel cell lifetime difficulties.

In order to maintain the benefits of maintaining physical separation of the anode and cathode manifolds while avoiding the difficulties of a cross-flow configuration, it has been discovered that the direction of flow in the anode can be modified to achieve co-current or counter-current flow within the fuel cell while still achieving a substantially uniform modified flow pattern within the anode. In order to achieve a substantially uniform modified flow pattern, however, it has been discovered that a relatively even distribution of the anode input flow needs to occur across the full width of the anode in the direction perpendicular to the desired direction of flow within the anode. Otherwise, flow pattern difficulties similar to the difficulties with a cross-flow configuration will remain, as there will be uneven distribution of gas within the anode.

In this discussion, modifying fuel cell operation to have co-current flow or counter-current flow is described based on modification of the direction of flow in the anode. Modification of the anode flow are described in order to facilitate description of the modifications. It is understood that the direction of flow in the cathode could be modified instead.

It has been discovered that a substantially uniform distribution of gas across the full width of the anode can be achieved in part by using a plurality of baffles. Initially, the anode input flow can enter the fuel cell stack and be diverted into an (input) extended edge seal chamber by a blocker. A first baffle can then be used to create a pressure drop for the anode input flow after entering the extended edge seal chamber but prior to entering the active area of the anode. A second baffle can be used to create a second pressure drop for the anode output flow prior to exiting the active area of the anode into a second (output) extended edge seal chamber. It has been discovered that having sufficient pressure drops on either side of the active area of the anode can allow for a uniform flow distribution within the active area of the anode. Additionally, it has been discovered that positioning the baffles roughly at the boundaries of the active area of the anode can reduce or minimize non-uniform operation within the active area of the fuel cell.

In order to achieve the desired substantially uniform distribution of gas while reducing or minimizing non-uniform operation, it has further been discovered that the type of baffle used can impact operation. To achieve a relatively uniform distribution of gas, the pressure drop between the extended edge seal area and the active area of the anode can be 0.1 kPa to 1.0 kPa. Achieving this level of pressure drop can require reducing the cross-sectional area of the flow field that is available for fluid flow to roughly 0.5% to 6.0%, or 0.5% to 4.0%, or 0.5% to 2.5%, of the total cross-sectional area of the flow field at the baffle location. In some aspects where a relatively uniform pattern of apertures is used along the full length of the baffle, the available cross-sectional fluid flow area at the baffle location can be 0.5% to 2.5% of the total cross-sectional area of the flow field at the baffle location. In aspects where additional available cross-sectional area is present at the end of the baffle that is farthest from the gas entry/exit location, the available cross-sectional area at the baffle location can be 0.5% to 4.0% or 0.5% to 6.0% of the total cross-sectional area of the flow field at the baffle location. In this discussion, the available cross-sectional fluid flow area at a baffle location is defined as the percentage of the total cross-sectional flow field area that remains open for fluid flow at the baffle location after placing the baffle in the flow field. As described in further detail below, the total cross-sectional flow field area can depend on the configuration of the fuel cell. In some aspects, the total flow field cross-sectional area at the location of the baffle can correspond to an area between a plate-like surface of an anode collector (or cathode collector) and an opposing separator plate that is compressed against the anode collector (or cathode collector) during construction of the fuel cell.

When determining the available cross-sectional flow field area provided by the apertures in a baffle, it is noted that for a V-shaped baffle, the size and/or number of apertures may be different for the two sides of the V. In such aspects, the available cross-sectional flow field area for a V-shaped baffle is defined as the available cross-sectional flow field area for the side of the baffle that has a lower cross-sectional flow field area. More generally, for any type of baffle shape where a gas flow must pass through two or more apertures to completely traverse the baffle, the available cross-sectional flow field area is defined as the cross-sectional area for the set of apertures corresponding to the lowest cross-sectional area.

Due in part to the relatively small amount of cross-sectional area that is available for fluid flow, it has been discovered that the pressure drop between the extended edge seal chambers and the anode has a relatively high sensitivity to variations in the cross-sectional area. Due to this relatively high sensitivity, it has been discovered that a solid baffle with apertures that otherwise occupies or fills the entire flow field (i.e., gas flow path) along a boundary or line between an extended edge seal chamber and the anode can provide improved operation. This improved operation is relative to a configuration where a baffle has a height that is less than the height of the flow field at the boundary, so that the baffle occupies or fills a majority, but not all, of the cross-sectional area of the flow field along a boundary between an extended edge seal chamber and the anode. This improved operation can be achieved in part based on the improved ability to control manufacturing tolerances for apertures within a baffle, as opposed to the manufacturing tolerances for the overall size and shape of a baffle.

It is noted that the location of the baffle defines a boundary between a first volume and a second volume. In aspects where the length of the baffle is less than the full length of fuel cell at the baffle location, the boundary is defined to extend beyond the baffle so that the boundary extends the full length of the fuel cell at the location. Thus, the boundary can be longer than the baffle that defines the boundary. It is further noted that the boundary defined by the baffle does not need to be the same as the boundary between the extended edge seal chamber and the anode (or cathode). For example, the baffle could be located within the extended edge seal chamber. For the input flow, this would mean that after passing through the baffle, the gas flow can still have a distance to travel before reaching the portion of the anode flow field that is associated with the active area of the anode. It is less preferred to have the baffle located over a portion of the anode active area, as this would mean that the anode gas flow could interact with the anode active area prior to achieving the improved gas flow distribution that is provided by the pressure drop across the baffle. In other words, having a baffle over a portion of the anode active area would mean that the anode input gas flow could enter the anode flow field associated with the anode active area before encountering the baffle.

In some aspects, the baffle can correspond to a compliant baffle that initially has a height that is slightly larger than the height of the flow field. In such aspects, the compliant baffle can deform under the pressure used for assembly of the fuel cell. This can reduce or minimize difficulties with managing tolerances for the height of the baffle while still allowing the baffle to completely block the flow field at the baffle location, with the exception of the apertures in the baffle.

A variety of options are available for how to use a baffle to provide a desired amount of available cross-sectional area for the flow field. For example, the apertures in a baffle can be uniform (i.e., substantially of the same size), or the size of the apertures can vary in a baffle. Optionally, the variation in aperture size can follow a pattern, such as alternating apertures of larger and smaller size, or increasing aperture size along the length of the baffle, or another convenient pattern. More generally, any convenient method for selecting aperture sizes can be used in order to achieve the desired amount of available flow field cross-sectional area.

In various aspects, for a V-shaped baffle, the apertures on one side of the "V" can be offset from the apertures on the second side of the V. By using apertures that are offset on the two sides of the V, any gas entering through an aperture on a first side of the V-shaped baffle is required to travel laterally within the baffle prior to exiting through on aperture on the second side. If the apertures on the two sides of the V are aligned, "channeling" of gas flow could occur, where gas could pass through aligned apertures without lateral movement. Such channeling can reduce the pressure drop across the baffle and/or can reduce the benefit provided by the baffle for producing a more desirable flow pattern. Although the apertures on different sides of a baffle are preferably offset, in some aspects the size and/or pattern of the apertures can otherwise be the same for the two sides of the baffle. In other aspects, at least one of the aperture size and the aperture pattern can vary between the two sides of a V-shaped baffle.

In some aspects, additional available cross-sectional flow field area can be provided at the end of the baffle that is farthest from the location where the anode gas flow enters/exits from the extended edge seal volume. For example, for the input extended edge seal volume, the anode input flow enters at a first end of the input extended edge seal volume. In such an example, the baffle between the input extended edge seal volume and the anode active area (optionally located at the anode inlet, which corresponds to the beginning of the anode active area) can allow for additional available cross-sectional flow field area at the baffle location at the second end of the input extended edge seal volume (i.e., at a portion of the inlet baffle location that is farthest from the gas input flow to the extended edge seal volume). This additional available cross-sectional flow field area can correspond to 25% or more of the total available cross-sectional flow field area, or 50% or more. Additionally or alternately, the amount of available cross-sectional flow field area that is located at a farthest end section of the baffle can correspond to 0.1% to 5.0% of the total cross-sectional flow field area, or 0.1% to 3.0%. In aspects where there is additional available cross-sectional flow field area at the farthest end of the baffle, the remaining portion of the baffle can have an available cross-sectional flow field area that corresponds to 0.4% to 2.5% of the total cross-sectional area of the flow field at the baffle location.

There are several options for providing the additional available cross-sectional flow field area. One option can be to have larger apertures in the portion of the baffle corresponding to 3.0% to 20% (or 3.0% to 15%, or 3.0% to 10%) of the length of the baffle and/or the length of the baffle location that is farthest from then entry point of anode input gas flow into the input extended edge seal volume. Similarly, for the output extended edge seal volume, larger apertures can be included in the portion of the baffle that is farthest from the exit point of anode output gas flow from the output extended edge seal volume. As an example, in some aspects the length of the flow field (corresponding to the interior length of a fuel cell) can be roughly 30 inches to 40 inches (roughly 750 mm to 1000 mm). A baffle for such a flow field can have a similar length. In an aspect where the baffle and/or the baffle location has a length of 30 inches (~750 mm), the final 1.0 inches (~25 mm) of the baffle and/or baffle location corresponds to roughly 3.3% of the length of the baffle and/or baffle location, while the final 6.0 inches (~150 mm) would correspond to roughly 20% of the length of the flow field at the baffle location.

Another option can be to use a baffle that is less than the full length of the flow field at the baffle location. In such an option, the baffle can be shorter than the full length of the flow field by 0.05% to 5.0% of the length of the flow field, or 0.05% to 3.0%, or 0.05% to 1.0%, or 1.0% to 5.0%. In such an option, the gap created due to the difference between the baffle length and the length of the flow field can be located at the end of the extended edge seal volume that is farthest from the input/exit location for the anode gas flow. As an example, an aspect where the length of the flow field is roughly 750 mm, a baffle that is shorter than the flow field by 0.05% would correspond to a baffle with a length of 749.6 mm A baffle that is shorter than the flow field by 5.0% would correspond to a baffle with a length of 712.5 mm. It is noted that for a baffle that is shorter than the full length of the flow field by a percentage amount, the amount of additional available cross-sectional flow field area due to the open gap is roughly the same as the difference in length between the baffle and the flow field. Thus, a baffle that is shorter than the flow field by 1.0% results in additional available cross-sectional flow field area of 1.0%.

Still another option can be to have an initial portion of a baffle (i.e., a portion closest to the flow input/output) that has a reduced or minimized amount of cross-sectional flow field area. For example, an initial 5.0% to 25% of the baffle can include less than 0.1% of available cross-sectional flow field area. Optionally, this can correspond to having no apertures in the initial 5.0% to 25% of the baffle.

In some aspects, the baffle for the input extended edge seal volume can be different from the baffle for the output extended edge seal volume. In such aspects, any convenient type of differences can be present between the baffles. This can include, but is not limited to, having different available cross-sectional flow field areas for the baffles; having different aperture sizes for the baffles; having a different pattern of apertures for the baffle; and/or having a difference in the amount of available cross-sectional flow field area at the end of the baffles. In some aspects, the difference in available cross-sectional flow field area between the input baffle and the output baffle can be 0.1% to 1.0%. In some aspects, the difference in available cross-sectional flow field area between the input baffle and the output baffle can be 1.1% to 5.0%.

General Molten Carbonate Fuel Cell Structure

FIG. 1 shows a general example of a portion of a molten carbonate fuel cell stack. The portion of the stack shown in FIG. 1 corresponds to a fuel cell 401. In order to isolate the fuel cell from adjacent fuel cells in the stack and/or other elements in the stack, the fuel cell includes separator plates 410 and 411. In FIG. 1, the fuel cell 401 includes an anode 430 and a cathode 450 that are separated by an electrolyte matrix 440 that contains an electrolyte 442. In various aspects, cathode 450 can correspond to a dual-layer (or multi-layer) cathode. Anode collector 420 provides electrical contact between anode 430 and the other anodes in the stack, while cathode collector 460 provides similar electrical contact between cathode 450 and the other cathodes in the fuel cell stack. Additionally, anode collector 420 allows for introduction and exhaust of gases from anode 430, while cathode collector 460 allows for introduction and exhaust of gases from cathode 450. The shape of anode collector 420 in FIG. 1 is intended to represent the concept that curved structures (such as curved protrusions from a plate-like surface) can be used to provide contact between anode collector 420 and either anode 430 or separator plate 410. For example, such curved structures can reside above a gap in the anode collector 420 to allow fluid to flow into and out of anode 430. Any other convenient shape can be used, including having at least one surface that corresponds to a plate-like surface with openings to allow gas to pass through the plate-like surface. Cathode collector 460 is similarly represented by curved surfaces, with the understanding that any other convenient shape could also be used.

During operation, $CO_2$ is passed into the cathode collector 460 along with $O_2$. The $CO_2$ and/or $O_2$ can be derived from any convenient source, such as air or flue gas from a combustion device. The $CO_2$ and $O_2$ diffuse into the porous cathode 450 and travel to a cathode interface region near the boundary of cathode 450 and electrolyte matrix 440. In the cathode interface region, a portion of electrolyte 442 can be present in the pores of cathode 450. The $CO_2$ and $O_2$ can be converted near/in the cathode interface region to carbonate ion ($CO_3^{2-}$), which can then be transported across electrolyte 442 (and therefore across electrolyte matrix 440) to facilitate generation of electrical current. In aspects where alternative ion transport is occurring, a portion of the $O_2$ can be converted to an alternative ion, such as a hydroxide ion or a peroxide ion, for transport in electrolyte 442. After transport across the electrolyte 442, the carbonate ion (or alternative ion) can reach an anode interface region near the boundary of electrolyte matrix 440 and anode 430. The carbonate ion can be converted back to $CO_2$ and $H_2O$ in the presence of $H_2$, releasing electrons that are used to form the current generated by the fuel cell. This can occur, for example, in the presence of electrolyte 442 within the pores of electrolyte matrix 440. The $H_2$ and/or a hydrocarbon suitable for forming $H_2$ are introduced into anode 430 via anode collector 420.

Figure 2:
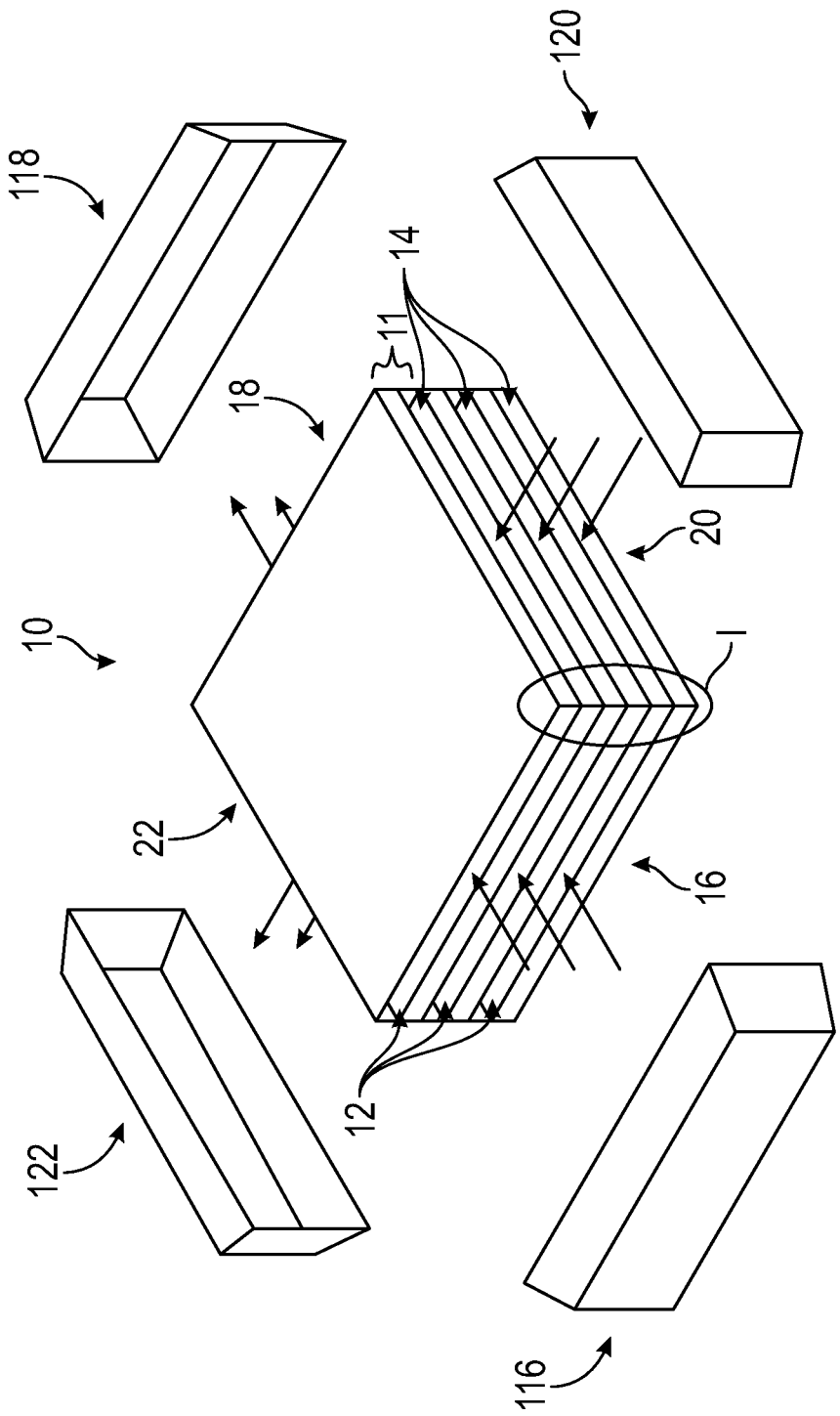
FIG. 2 is a perspective view of a fuel cell stack configured for cross-flow operation.

Referring to FIG. 2, a conventional fuel cell stack 10 includes a plurality of fuel cells 11 (such as fuel cell 401 shown in FIG. 1), each having an anode layer 12 (comprising an anode electrode and an anode flow chamber/current collector, not shown) and a cathode layer 14 (comprising a cathode electrode and an cathode flow chamber/current collector, not shown), with the fuel cells stacked one on top of another and so on. The fuel cell stack 10 includes an anode inlet side (or stack face) 16 configured to receive anode feed gas and an opposing anode outlet side (or stack face) 18 configured to output anode exhaust after it has passed through an anode layer 12. The anode feed gas may be provided via an external manifold (anode inlet manifold 116) adjacent to and sealed against the anode inlet stack face 16. For reference purposes, the external manifolds depicted in FIG. 2 have been removed from the fuel cell stack 10. To be clear, during operation, external manifolds (e.g., anode inlet manifold 116) would be sealed against corresponding fuel stack face. The anode exhaust may be received by another external manifold adjacent to and sealed against the anode outlet stack face 18 (anode outlet manifold 118). The fuel cell stack 10 further includes a cathode inlet side (or stack face) 20 configured to receive cathode feed gas and an opposing cathode outlet side (or stack face) 22 configured to output cathode exhaust after it has passed through a cathode layer 14. The cathode feed gas may be provided via an external manifold adjacent to and sealed against the cathode inlet stack face 20 (cathode inlet manifold 120). The cathode exhaust may be received by another external manifold sealed against the cathode outlet stack face 22 (cathode outlet manifold 122). In some embodiments, at least three of the four stack faces may have external manifolds sealed against each stack face. For example, the stack may be housed in sealed housing (e.g., module) and the anode inlet side, the anode outlet side, and the cathode inlet side may be sealed with external manifolds. The cathode outlet side in this example may be open to the sealed housing.

In the conventional fuel cell stack 10 shown in FIG. 2, anode feed gas flows through each anode layer 12 in a substantially linear direction from the anode inlet stack face 16 to the anode outlet stack face 18. (As referenced herein, "substantially linear" means a majority of volume of a gas flows in a certain direction.) Similarly, the cathode feed gas flows through the cathode layer 14 in a substantially linear direction from the cathode inlet stack face 20 to the cathode outlet stack face 22. The anode and cathode feed gases flow substantially perpendicularly to each other (i.e., a majority of volume of anode feed gas flows in a first direction and a majority of volume of cathode feed gas flows in a second direction that is substantially perpendicular to the first direction) when they are within the stack (also known as "cross-flow"). Because of this, the current density may be highest at a corner of the fuel cell stack 10, proximate where the anode inlet side 16 meets the cathode inlet side 20 (region I) and varies non-linearly in the directions of each of the anode feed gas flow and the cathode feed gas flow through the fuel cell assembly 11. It would therefore be advantageous to reorient the flow of the anode feed gas and the cathode feed gas relative to each other within the stack, such that the anode and cathode flows pass through the fuel cell stack 10 in a substantially parallel configuration (also known as "parallel flow", "co-flow", or "counter-flow").

The present invention allows substantially parallel flow of two process gas mixtures within a four-sided fuel cell stack where the two process gas mixtures are supplied and removed from the stack in substantially perpendicular directions from each other. In other words, the present invention allows substantially parallel flow within a fuel cell stack without significantly changing the process gas delivery to and from the fuel cell stack (i.e., with external manifolds) as described in relation to FIG. 2.

Figure 3:
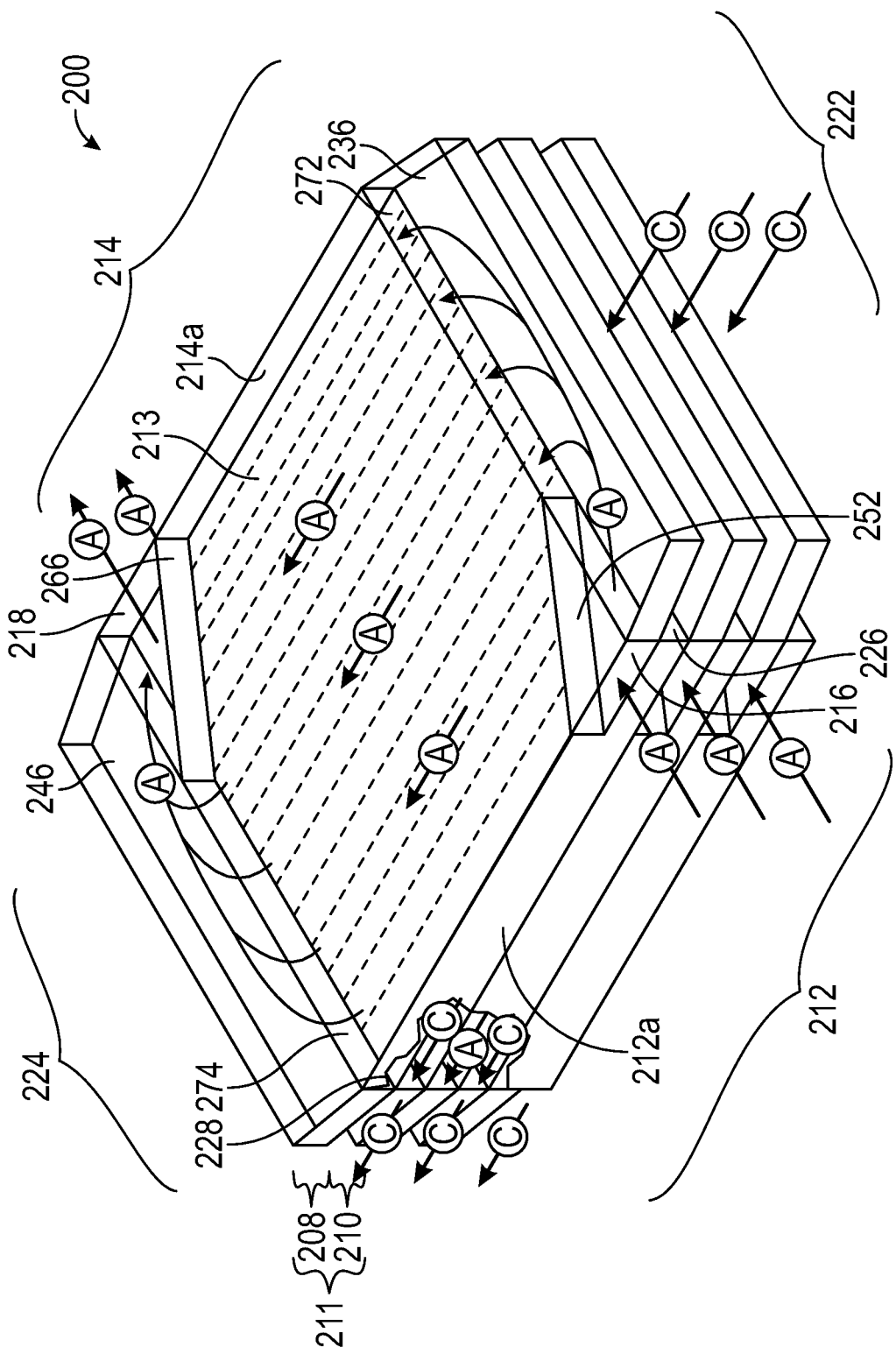
FIG. 3 is a perspective view of a fuel cell stack, according to an exemplary embodiment.

Referring now to FIG. 3, the fuel cell stack 200 shows how anode feed gas passes through corners of the fuel cell stack 200 to be redirected substantially parallel to the cathode feed gas and anode exhaust is again redirected to be output substantially perpendicular to the cathode exhaust. (For ease of reference, arrows designated with "A" represent the flow path for anode process gas and arrows designated with "C" represent the flow path for cathode process gas.) The fuel cell stack 200 includes a plurality of fuel cell assemblies 211, each having an anode layer 208 and a cathode layer 210, with the fuel cells stacked on top of one another and separated from each other by a steal separator sheet (e.g., a bipolar plate). It is noted that the top surface of the top most fuel cell assembly 211 has been removed to show flow paths within that fuel cell assembly. It will be appreciated that save for the porous active area of the anode electrode (anode active area) 213, the anode layer 208 of each fuel cell assembly 211 is otherwise a sealed chamber with a single inlet (partial anode inlet 216, discussed below) and a single outlet (partial anode outlet 218, discussed below). As used herein, "active area" is the area on a fuel cell layer (anode, cathode) that is configured to allow selective diffusion of molecules in a process gas to diffuse there through, i.e., feed gases undergo an electrochemical reaction in the active area. Said another way, the leading and trailing edges of both the anode and cathode of a fuel cell have a narrow non-active area corresponding to a wet seal between adjacent cells above and below the fuel cell. Feed gases pass through the wet seal without undergoing an electrochemical reaction. The rest of the area of the fuel cell, which is overlapping and common to both the anode and cathode layers, is subject to electrochemical activity and is known as the "active area". Similarly, apart from a porous active cathode electrode (not shown), the cathode layer 210 of each fuel cell assembly 211 is otherwise a sealed chamber with a cathode inlet 226 and a cathode outlet 228. It will be further noted that portions of the side walls of the fuel cell assemblies 211 have been removed to show flow paths through the cathode layer of the top most fuel cell assembly 211 (and flow paths of the anode and cathode layers of the fuel cell assembly 211 directly below the top most fuel cell assembly 211). It will also be further noted that reference may be made to enumerated features corresponding to the top most fuel cell assembly 211, but such enumerated features may be applicable to other fuel cell assemblies 211 included in fuel cell stack 200.

It will be noted that the fuel cell assemblies 211 described herein include an anode layer 208 and a cathode layer 210 separated by an electrolyte matrix layer, and steel separator sheets form the upper surface and lower surface of the fuel cell assembly. However, in other embodiments, a first fuel cell assembly may include an anode layer 208 and a cathode layer 210 separated by a steel separator sheet, and an anode electrode forms a first surface (e.g., upper surface) and a cathode electrode forms a second surface (e.g., lower surface). A single functional fuel cell unit is formed when a second fuel cell assembly (having the same components as the first fuel cell assembly) is stacked on top or below the first fuel cell assembly and the two fuel cell assemblies are separated by an electrolyte matrix layer. In other words, a single fuel cell unit is formed when the cathode of the first fuel cell assembly communicates with an electrolyte matrix, which communicates with the anode of the second fuel cell assembly.

Although FIG. 3 shows three fuel cell assemblies 211, the invention is not so limited and a fuel cell stack may comprise more or less fuel cell assemblies. Each fuel cell assembly 211 includes two extended edge seal chambers 236, 246—a first extended edge seal chamber 236 (e.g., an upstream extended edge seal chamber) on a first side of the fuel cell assembly and a second extended edge seal chamber 246 (e.g., a downstream extended edge seal chamber) on the opposite side of the fuel cell assembly. As depicted in FIG. 3, the extended edge seal chambers extend cantilever outboard from the stack face, beyond the active area on two opposite sides of the fuel cell.

As with the fuel cell stack 10 depicted in FIG. 2, the fuel cell stack 200 (in FIG. 3) includes an anode inlet side (or stack face) 212 and an opposing anode outlet side (or stack face) 214, which is substantially parallel to the anode inlet side 212. However, unlike the anode inlet stack face 16 of fuel cell stack 10, which includes a substantially open face/inlet for anode feed gas to enter each fuel cell, the anode inlet stack face 212 is not so open and each fuel cell assembly 211 includes a first partial seal 212*a* and a partial anode inlet 216. In an exemplary embodiment, an external manifold is sealed against the anode inlet stack face 212 (not shown) and anode feed gas provided in the external manifold (not shown) enters the anode section of the fuel cell via the partial anode inlet 216. Thus, the external manifold and partial anode inlet 216 are adjacent to the anode inlet stack face 212. Similarly, unlike the anode outlet stack face 18 of fuel cell stack 10, which includes a substantially open face/outlet (not shown) for anode exhaust to leave each fuel cell, the anode outlet stack face 214 is not so open and each fuel cell assembly 211 includes a second partial seal 214*a* and a partial anode outlet 218. Thus, partial anode outlet 218 is adjacent to anode outlet stack face 214.

During operation of the fuel cell stack 200, each anode layer 208 is configured to receive anode feed gas at the anode inlet side 212 of the fuel cell stack 200 from an anode feed gas supply (i.e., source), for example, via an external manifold (not shown), and to output anode exhaust at the anode outlet side 214 of the fuel cell stack 200, for example, via another external manifold (not shown), after the anode feed gas has been reacted with cathode feed gas in the fuel cell stack 200. Specifically, each anode layer 208 includes a partial anode inlet 216 (i.e., an anode inlet opening) formed in only a portion of the anode inlet side 212, at an upstream portion of the anode layer 208. Each anode layer 208 further includes a partial anode outlet 218 (i.e., an anode outlet opening) formed in only a portion of the anode outlet side 214, at a downstream portion of the anode layer 208.

The fuel cell stack 200 further includes a cathode inlet side (or stack face) 222 and an opposing cathode outlet side (or stack face) 224, which is substantially parallel to the cathode inlet side 222. In some embodiments, the cathode layers 210 are similar in structure to, and similarly operate as, the cathode layers 14 of fuel cell stack 10 depicted in FIG. 2. In other words, in some embodiments, the cathode feed gas may flow through the cathode layer 210 in a substantially linear direction from the cathode inlet stack face 222 to the cathode outlet stack face 224. As depicted in FIG. 3, it will be appreciated that the first extended edge seal chamber 236 (at the anode layer 208) is cantilevered over a cathode inlet 226.

Moreover, a plurality of the first extended edge seal chambers 236 forms a series of cantilevered protrusions along the cathode inlet stack face 222. These cantilevered first extended edge seal chambers are adjacent to the anode 208 on the cathode inlet stack face 222. Similarly, a plurality of the second extended edge seal chambers 246 forms a series of cantilevered protrusions along the cathode outlet stack face 224. These cantilevered second extended edge seal chambers are adjacent to the anode 208 on the cathode outlet stack face 224.

During operation of the fuel cell stack 200, each cathode layer 210 is configured to receive cathode feed gas at the cathode inlet side 222 of the fuel cell stack 200 from a cathode feed gas supply (i.e., source), for example, via an external manifold (not shown), and to output cathode exhaust at the cathode outlet side 224 of the fuel cell stack 200, for example, via an external manifold (not shown), after the cathode feed gas has been reacted with anode feed gas in the fuel cell stack 200. Specifically, each cathode layer 210 includes a cathode inlet 226 (i.e., a cathode inlet opening) formed in the cathode inlet side 222, at an upstream portion of the cathode layer 210. Each cathode layer 210 further includes a cathode outlet 228 (i.e., a cathode outlet opening) formed in the cathode outlet side 224, at a downstream portion of the cathode layer 210. According to an exemplary embodiment, the cathode inlet 226 and the cathode outlet 228 may extend substantially an entire width of the cathode layer 210, although according to other exemplary embodiments, the cathode inlet 226 and/or the cathode outlet 228 may extend along only a portion of the width of the cathode layer 210.

As shown in FIG. 3, the anode feed gas is supplied to and the anode exhaust is output from the anode layer 208 along substantially parallel flow paths through the fuel cells and fuel cell stack. For example, the anode feed gas is fed to the anode layer 208 from the anode inlet manifold (not shown) along a streamline substantially perpendicularly to the anode inlet stack face 212. The anode feed gas fed through partial anode inlet 216 is redirected with an anode inlet diverter (a blocker or diverting surface) 252 through the first extended edge seal chamber 236 and back into the anode active area 213 of the fuel cell assembly 211 into a stream substantially parallel with the flow of cathode feed gas and then into the second extended edge seal chamber 246 and then output through the partial anode outlet 218. It will be appreciated that a portion of the anode gas traveling through the active anode section is redirected with a first side of an anode outlet diverter (another blocker or diverting surface) 266 into the second extended edge seal chamber 246 and that the anode gas traveling through the second extended edge seal chamber 246 may be redirected with a second side of the anode outlet diverter 266 through the partial anode outlet 218.

In the above configuration, the anode exhaust is diverted into a streamline flowing substantially perpendicularly to the anode outlet stack face 214 of the fuel cell stack 200. As further shown in FIG. 3, the cathode inlet stack face 222 and the cathode outlet stack face 224 are substantially perpendicular to the anode inlet stack face 212 and the anode outlet stack face 214 of the fuel cell stack 200. In this configuration, the cathode feed gas is supplied to and the cathode exhaust is output from the cathode layer 210 along substantially parallel flow paths from each other. For example, the cathode feed gas flows along a streamline substantially perpendicularly to the cathode inlet stack face 222 and the cathode exhaust gas flows along a streamline substantially perpendicularly to the cathode outlet stack face 224.

According to an exemplary embodiment, the flow of the cathode feed gas through the cathode layer 210, as it is reacted and converted into cathode exhaust, flows along a substantially linear streamline between the cathode inlet 226 and the cathode outlet 228.

Although the first and second extended edge seal chambers 236, 246 depicted in FIG. 3 have a trapezoidal footprint extending away from the anode active area bounded by one long sidewall, two shorter sidewalls, a top surface, and a bottom surface, it will be appreciated that the invention is not so limited. The first extended edge seal chamber 236 may have any dimension, or be any shape, that encloses a chamber capable of accepting anode process gas fed via partial anode inlet 216 and redirected by anode inlet diverter 252 and providing that anode process gas to the anode active area 213 through anode active area inlet 272. Similarly, the second extended edge seal chamber 246 may have any dimension, or be any shape, that encloses a chamber capable of accepting anode process gas fed via anode active area outlet 274 and providing that anode process gas through the partial anode outlet 218 (via redirection by anode outlet divert 266).

As shown in FIG. 3, the anode inlet diverter 252 extends at a non-perpendicular angle relative to each of the anode inlet side 212 and cathode inlet side 222 of the fuel cell stack 200. Also, as depicted in FIG. 3, the anode inlet diverter 252 extends in a straight, linear fashion from the anode inlet side 212 toward the cathode inlet side 222. However, the anode inlet diverter 252 may be curved (concave or convex) or any other shape, as long as it redirects anode process gas fed through partial anode inlet 216 into the first extended edge seal chamber 236. The anode inlet diverter 252 extends vertically along substantially an entire height of the anode layer 208. This can reduce, minimize, or potentially even eliminate passage of anode feed gas over and/or under the anode inlet diverter 252. Due to the difficulties in forming a seal between non-compressible metal surfaces, however, in some aspects a small portion of the anode feed gas can still pass over and/or under the anode inlet diverter 252 into anode layer 208.

Similarly, anode outlet diverter 266 extends at a non-perpendicular angle relative to each of the anode outlet side 214 and cathode outlet side 224 of the fuel cell stack 200. Although the anode inlet diverter 252 depicted in FIG. 3 extends in a straight, linear fashion from the anode outlet side 214 toward the cathode outlet side 224, the anode inlet diverter 252 may be curved (concave or convex) or any other shape, as long as it redirects anode process gas fed through second extended edge seal chamber 236 through the partial anode outlet 218. The anode outlet diverter 266 extends vertically along substantially an entire height of the anode layer 208. Similar to anode inlet diverter 252, the anode outlet diverter reduces or minimizes passage of anode outlet gas over and/or under the anode outlet diverter 266. However, due to difficulties in forming seals between non-compressible surfaces, in some aspects some flow of anode outlet gas over and/or under the anode outlet diverter 266 can occur.

Referring back to FIG. 2, it will be appreciated that as a process gas flows through a fuel cell, the composition of that gas will change as it travels across the fuel cell and is reacted with another process gas in the fuel cell. As such, the composition of the anode process gas flowing through fuel cell stack 10 (in FIG. 2) changes as it travels from the anode inlet side 16 to the anode outlet side 18 of the stack. However, the composition of the cathode process gas entering fuel cell stack 10 is uniformly distributed along the width of the cathode layer 14 (measured from the anode inlet side 16 to the anode outlet side 18 of the fuel cell stack 10). In contrast, during operation of the embodiment depicted in FIG. 3, the anode process gas enters the anode active area 213 through the active anode inlet 272 rather than an opening spanning the anode inlet side 212 of the fuel cell stack 200 (such as depicted in FIG. 2). As with fuel cell stack 10 (in FIG. 2), the cathode process gas enters the fuel cell stack 200 (at the cathode inlet side 222) in a substantially uniform flow distribution along the entire width of the cathode layer 210 (measured from the anode inlet side 212 to the anode outlet side 214 of the fuel cell stack 200). Thus, the composition of the anode process gas entering the anode active area 213 and the composition of the cathode process gas entering the cathode layer 210 are substantially uniform across the width of the fuel cell stack 200 (measured from the anode inlet side 212 to the anode outlet side 214 of the fuel cell stack 200). As will be discussed below, the uniform compositional distribution of the process gases entering the stack (along the width of the cathode inlet) in a substantially parallel fashion enables a more uniform distribution of current density across the cathode inlet span, instead of higher current densities proximate the anode inlet side 16 and cathode inlet side 20 of stack 10 (region I of FIG. 2) and lower current densities away from the inlets.

Figure 4C:
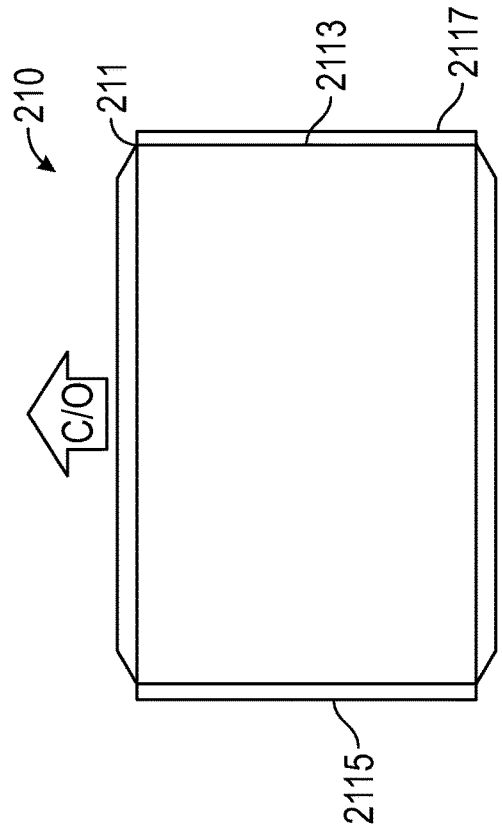
FIG. 4C is a top plan view of a cathode level of the fuel cell assembly depicted in FIG. 4A.
Figure 4A:
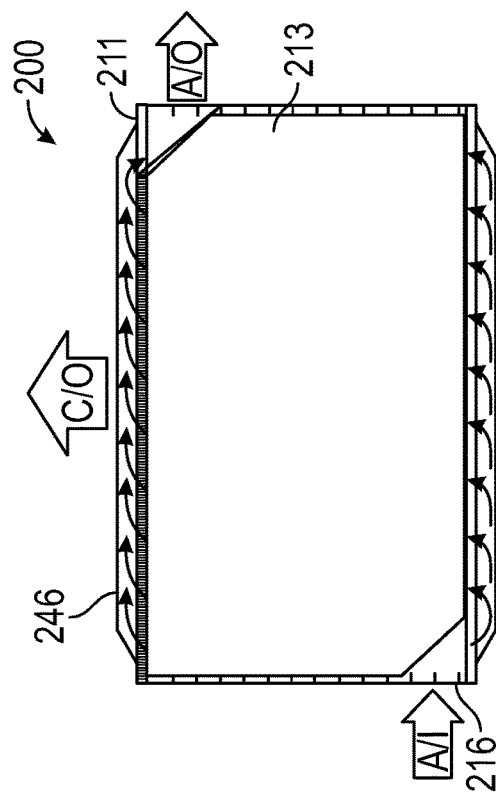
FIG. 4A is a top plan view of a fuel cell assembly, according to an exemplary embodiment.

FIG. 4A is a top plan view of fuel cell stack 200 with the top surface of the anode layer 208 (of the topmost fuel cell assembly 211) removed to show (a) anode feed gas entering the anode active area 213 from a first extended edge seal chamber 236, and (b) anode exhaust entering the second extended edge seal chamber 246 from the anode active area 213. The flow of anode process gas across the anode active area (which enters as anode feed gas and exits as anode exhaust) in a substantially linear fashion parallel to the flow of cathode process gas through the cathode layer 210 of the fuel cell assembly 211. As noted above, this flow arrangement may be described as co-flow.

Figure 4D:
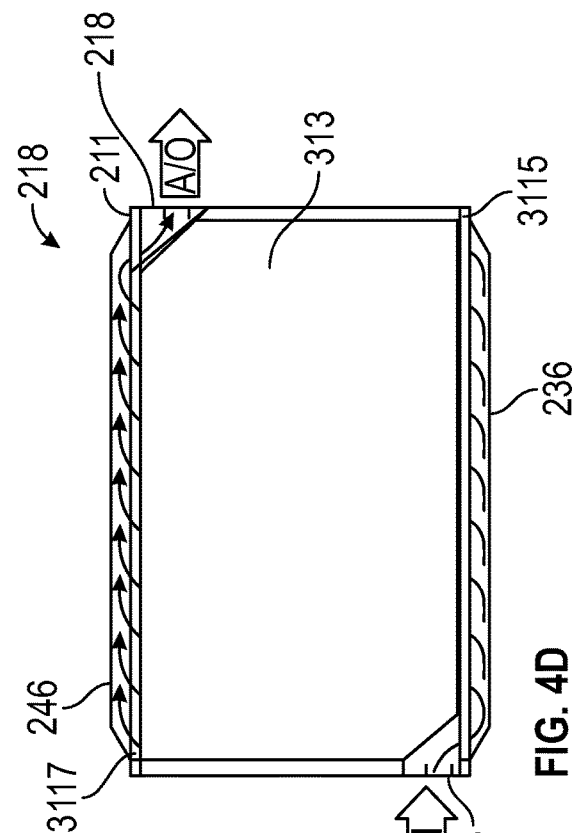
FIG. 4D is a top plan view of an anode level of the fuel cell assembly depicted in FIG. 4A.
Figure 4B:
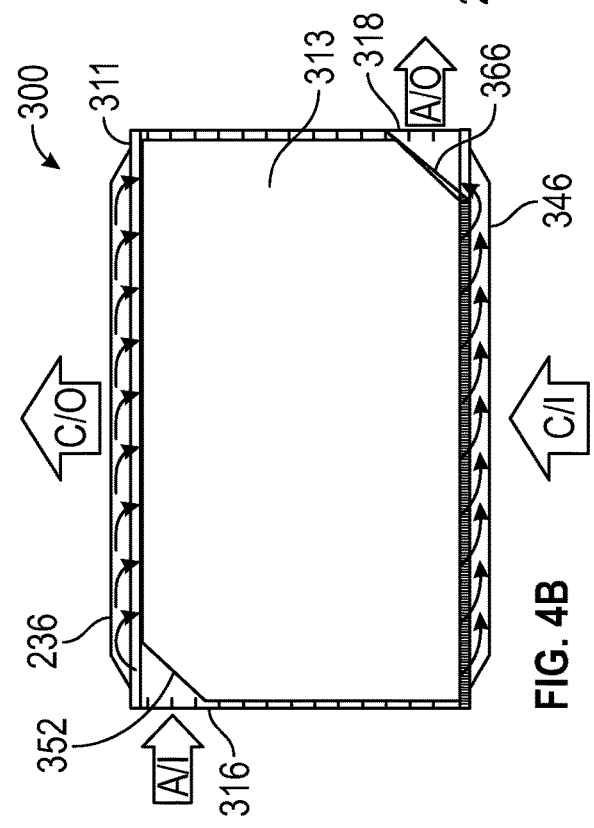
FIG. 4B is a top plan view of a fuel cell assembly, according to another exemplary embodiment.

FIG. 4B depicts anode process gas flow through a fuel cell assembly in a counter-flow direction. FIG. 4B is a top plan view of fuel cell stack 300 with the top surface of the anode layer 308 (of the topmost fuel cell assembly 311) removed. Similar to fuel cell stack 200 and fuel cell assembly 211, the anode process gas enters fuel cell stack 300/fuel cell assembly 311 from an anode inlet side that is perpendicular to a side where cathode process gas enters and anode process gas exits a side opposite the anode inlet side and the cathode process gas exits a side opposite the cathode inlet side. The anode process gas enters the anode inlet side of fuel cell assembly 311 via a partial anode inlet 316, which is similar to the partial anode inlet 216 (for fuel cell assembly 211). However, partial anode inlet 316 is proximate a stack corner between the anode inlet side and the cathode outlet side of fuel cell stack 300. Whereas the partial anode inlet 216 (for fuel cell assembly 211) is proximate a stack corner between the anode inlet side and the cathode inlet side of fuel cell stack 200. After entering the fuel cell assembly 311, the anode process gas is redirected (by an anode inlet diverter 352) into a first extended edge seal chamber 326 (located on a cathode outlet side of fuel cell assembly 311) and redirected further into the anode active area 313. Reacted anode process gas exits the anode active area 313 and enters the second extended edge seal chamber 346 and is redirected toward anode outlet divert 366 and anode partial outlet 318. In this configuration, the anode process gas traverses the anode active area 313 in a direction substantially parallel to, but opposite of, the cathode process gas traversing thru the cathode layer of fuel cell assembly 311.

In either flow configuration (co-flow or counter-flow), the distribution of each of the anode feed gas and cathode feed gas is substantially uniform laterally across the fuel cell stack in the direction from the anode inlet side to the anode outlet side, providing a one-dimensional distribution of current density across the fuel cell stack (measured from cathode inlet to cathode outlet).

It will be appreciated that the co-flow configuration depicted in FIG. 4A and the counter-flow configuration depicted in FIG. 4B can utilize the same external manifold arrangements described herein with respect to fuel cell stack 10 (depicted in FIG. 2). Alternatively, a counter-flow configuration may be achieved with the embodiment of FIG. 4A by rearranging the direction of the anode process gas through the fuel cell stack (e.g., switching the anode inlet manifold with the anode outlet manifold) or by rearranging the direction of the cathode process gas through the fuel cell stack (e.g., switching the cathode inlet manifold with the cathode outlet manifold).

FIG. 4C is a top plan view of cathode layer 210 (of fuel cell assembly 211) with the cathode electrode removed to show cathode active area 2113. During operation, cathode process gas traverses cathode active area 2113 in a substantially linear path from the cathode inlet side to the cathode outlet side. First cathode edge seal 2115 prevents cathode process gas from entering the anode inlet side of fuel cell assembly 211, e.g., anode inlet manifold (not shown). Second cathode edge seal 2117 prevents cathode process gas from entering the anode outlet side of fuel cell assembly 211, e.g., anode outlet manifold (not shown).

FIG. 4D is a top plan view of anode layer 208 (of fuel cell assembly 211) with major portions of the top surface covering the anode active area 313 and the extended edge seal chambers 236, 246. During operation, as described in detail above, anode process gas enters first extended edge seal chamber 236 and traverses anode active area 313 in a substantially linear path from the cathode inlet side to the cathode outlet side (of fuel cell assembly 211). First anode edge seal 3115 prevents anode process gas from entering cathode inlet side of the fuel cell assembly 211, e.g., cathode inlet manifold (not shown), as the anode process gas travels from partial anode inlet 216 to first extended edge seal chamber 236 and to anode active area 313. Second anode edge seal 3117 prevents anode process gas from entering the cathode outlet side of fuel cell assembly 211, e.g., cathode outlet manifold (not shown), as anode process gas travels from anode active area 313 to second extended edge seal chamber 246 and to anode partial outlet 218.

According to yet another exemplary embodiment, it should be understood that the cathode layer 210 may be configured in substantially the same way as and in place of the anode layer 208, such that an extended edge seal chamber associated with the cathode inlet (e.g., "cathode inlet chamber" or first extended edge seal chamber 236) is disposed on a stack side adjacent (and perpendicular) to the cathode inlet side 222 and configured to cooperate with an inlet diverter in the cathode layer 210 to redirect cathode feed gas therein to be substantially parallel with anode feed gas received directly at the anode inlet side 212 of the stack. Similarly, an extended edge seal chamber associated with the cathode outlet (e.g., "cathode outlet chamber" or second extended edge seal chamber 246) may be disposed on a stack side opposite the cathode inlet chamber and configured to cooperate with an outlet diverter in the cathode layer to redirect cathode exhaust from the fuel cell stack 200.

In this discussion, fluid communication between elements refers to the ability for fluids (gas and/or liquid) to flow between two elements. Direct fluid communication refers fluids being able to pass between two elements without passing through another intervening element. Indirect fluid communication refers to fluids traveling from a first element to a second element by passing through an intervening element. For example, in FIG. 3, partial anode inlet 216 is in direct fluid communication with extended edge seal chamber 236. Partial anode inlet 216 is in indirect fluid communication with anode layer 208 via extended edge seal chamber 236. It is noted that when a baffle structure is present at the boundary between an extended edge seal chamber and the anode, the extended edge seal chamber can be in indirect fluid communication with the anode via the baffle. Alternatively, if the baffle is located entirely within the extended edge seal chamber, then a portion of the extended edge seal chamber may be in direct fluid communication with the anode.

Baffle Structure and Manufacturing Tolerances

One method for forming molten carbonate fuel cells, such as the fuel cells shown in any of FIGS. 1-4, is to build the fuel cell in layers and then compress the layers together to seal the fuel cell and form the desired electrical contacts. However, when attempting to add a baffle to the anode (or cathode) flow field to achieve a desired pressure drop, the manufacturing tolerances involved in this type of layered construction can pose difficulties.

In a molten carbonate fuel cell, the height of the anode flow field can typically be between 1.0 mm to 4.0 mm, or 1.0 mm to 3.0 mm, or 1.3 mm to 4.0 mm, or 1.3 mm to 3.0 mm. The height of the flow field can be selected based on the design of the anode collector (or cathode collector). For example, in some aspects the anode collector can correspond to a plate like structure with protrusions that provide gaps to allow passage of gas through the anode collector into the pores of the anode. A separator plate is then compressed onto the anode collector. In such aspects, the height of the flow field can roughly correspond to the height of the protrusions, or alternatively can correspond to the height of the protrusions plus the thickness of the plate-like structure, depending on the configuration. In some aspects, the baffle can reside on the plate-like structure in a gap between protrusions. In such aspects, the height of the flow field at the location of the baffle can correspond to the height of the protrusions.

Due to limitations in the nature of how sheet metal can be processed to form the various fuel cell layers, the height of the anode flow field can vary by +/−0.025 mm. When forming a solid cylinder (or other shape) for use as a baffle, the size of the baffle can also vary by +/−0.025 mm. Thus, when attempting to insert a baffle while providing a desired gap in the flow field, the combination of the two tolerances means that the size of the gap can vary by as much as 0.05 mm.

In various aspects, an improved uniformity in the anode flow can be achieved by using a baffle to create a pressure drop between the extended edge seal volume and the anode of 0.1 kPa to 1.0 kPa. To achieve this level of pressure drop, the baffle needs to block 94% or more of the cross-sectional area of the flow field, so that the available cross-sectional area for fluid flow is between 0.5% to 6.0% of the original flow field cross-sectional area, or between 0.5% to 4.0%, or between 0.5% to 2.5%. In aspects where additional available cross-sectional area is present at the end of the baffle that is farthest from the gas entry/exit location, the available cross-sectional area can be 0.5% to 2.5%, or 0.5% to 4.0% or 0.5% to 6.0% of the total cross-sectional area of the flow field. In other aspects, it can be desirable to have a baffle that constrains flow along the full length of the baffle. In such other aspects, it can be desirable to block 97.5% or more of the cross-sectional area of the flow field. In such other aspects, the available cross-sectional fluid flow area can be 0.5% to 2.5% of the total cross-sectional area of the flow field at the baffle location.

In various aspects, it has been discovered that the flow pattern and/or general operation of a molten carbonate fuel cell can be improved by including improved baffle structures in the flow field for the anode flow and/or the cathode flow. The improved baffle structures can occupy the full height of the flow field, so that the pressure drop is managed based on apertures (such as perforations) in the baffle. This is in contrast to a conventional baffle design, where the pressure drop across the baffle would be determined based on the baffle height being less than the height of the flow field, so that gas could flow above/below the baffle.

A baffle can be formed from a convenient material that does not degrade in the presence of the anode input flow, such as stainless steel. The apertures can be formed in the baffle by a technique with low size variability, such as photochemical etching. Photochemical etching has a tolerance for size variability of 0.001 inches (0.025 mm). The apertures can correspond to holes, slots, or any other convenient shape that has a desired cross-sectional area. After forming the apertures, the sheet metal can be formed into a desired baffle shape using conventional methods, such as using a press brake and tooling dies.

The baffle can be formed in any convenient shape that allows for formation of apertures to allow gas flow while also blocking the full height of the flow field. An example of a suitable shape for a baffle can be a V-shaped baffle, oriented so that the bottom of the "V" is closest to the anode during assembly. For a rigid or non-compressible baffle, the baffle can have the same height as the flow field, so that substantially all of the flow field is blocked by the baffle (with the exception of the apertures) when the fuel cell is assembled. For a compressible baffle, the baffle can have a height that is greater than the height of the flow field by roughly 0.1 mm to 0.2 mm. When the fuel cell is assembled, the baffle can be compressed so that the compressed baffle substantially matches the height of the flow field. In such aspects, the top of the baffle structure can include tabs or flanges that serve as the initial contact point(s) with the layer above the baffle during fuel cell assembly. For example, for a V-shaped baffle, additional tabs or flanges can be present at the top of each arm of the baffle. It is noted that the compressible nature of the baffle can also be beneficial for any small changes in the height of the flow field that might occur during fuel cell operation, such as changes in the height of the flow field due to differential thermal expansion of various elements.

FIG. 5 shows an example of a baffle that can include a plurality of apertures to manage flow of gas across the baffle. In FIG. 5, a baffle 510 rests in a gap between the curved protrusions 520 of an anode collector structure 501. Baffle 510 is shown as a V-shaped baffle, but any other convenient shape can be used that permits formation of apertures to allow gas flow.

In some aspects, the position for the baffle (i.e., the gap between the curved protrusions 520 of anode collector structure 501) can be substantially aligned with the interface between an extended edge seal volume and the active area of the anode. In other aspects, the baffle position can be entirely within the extended edge seal volume. Using either positioning, the baffle can provide a flow restriction (i.e., a pressure drop) so that the anode input flow gas distributes in a substantially uniform manner throughout the extended edge seal volume prior to passing through the baffle into the anode. By substantially aligning the baffle with the interface between the extended edge seal volume and the active area of the anode, or by positioning the baffle entirely within the extended edge seal volume, variations in current density can be reduced or minimized. If the baffle was located so that the anode input flow could contact a substantial portion of the anode active area prior to passing through the baffle, then the contacted portion of the anode active area would be exposed to an increased pressure of anode input flow relative to the rest of the anode active area. This would contribute to non-uniformity in current density. It is noted that positioning the baffle so that the anode input flow is still within the extended edge seal volume after passing through the baffle can potentially reduce the available volume within the extended edge seal volume for holding the anode input flow prior to passing through the baffle. In aspects where the baffle is located within an extended edge seal chamber, the portions of the chamber volume on either side of the baffle can be referred to as separate chamber volumes.

In the example shown in FIG. 5, the bottom of baffle 510 rests on a plate-like bottom surface of anode collector structure 501. The top of baffle 510 includes top surfaces 512 that correspond to flanges or tabs that extend from sidewalls 540. The top surfaces 512 of baffle 510 are slightly taller than the curved protrusions 520 that are used to contact the separator plate (not shown). For example, top surfaces 512 of the baffle 510 can be higher than the top surfaces of the curved protrusions 520 by a compression height 514 of roughly 0.002 inches to 0.01 inches (~0.04 mm to 0.25 mm). The top surfaces 512 of baffle 510 can be compressed when the fuel cell is assembled so that the baffle is compressed to have the same height as the curved protrusions 520. This means that the baffle can also have the same height as the full height of the flow field 530 for the anode input flow. Using a compressible baffle can reduce or minimize issues related to manufacturing tolerances, as a height variation on the order of 0.025 mm (0.001 inches) for the top surface of a compressible baffle will not substantially change the operation of a compressible baffle. Instead, such height variations will primarily change the amount of compression for the baffle during fuel cell assembly.

As an alternative, a non-compressible baffle can also be used. FIG. 6 shows an example of a non-compressible baffle 610. The non-compressible baffle in FIG. 6 can be located in a gap between curved protrusions 520 in a manner similar to FIG. 5. However, the height of the sidewalls 640 of non-compressible baffle 610 can be substantially the same as the height of the flow field, so that substantially the entire flow field is blocked, except for the apertures in the baffle. Thus, the height of the non-compressible baffle 610 can correspond to the flow field height that is defined by the distance from the bottom surface 660 of the anode collector (or cathode collector) and the surface of the adjacent separator plate 670. Again, any convenient shape can be used for non-compressible baffle 610, so long as apertures can be formed in the baffle to provides the desired cross-sectional area for fluid flow. It is noted that for a non-compressible baffle, a baffle having a single wall shape or a solid shape may be suitable, so long as the apertures can be formed.

In order to allow gas to pass through a baffle, such as the baffles shown in FIG. 5 or FIG. 6, apertures (not shown) can be drilled, etched, or otherwise formed in the sidewalls 540 of baffle 510 or sidewall(s) 640 of baffle 610. The apertures can be seen in FIG. 7, which shows a perspective view of the baffle 510. As shown in FIG. 7, the apertures 750 correspond to openings that are substantially uniformly distributed along the length of the baffle 510. Although the apertures in FIG. 7 are shown as being placed at a height that is roughly halfway between the top and the bottom of the flow field, other convenient heights and/or patterns for varying the height could be used.

In aspects where the baffle can be compressed, the sheet metal used for forming the baffle shape can have a thickness of roughly 0.25 mm to 0.40 mm. The thickness of the sheet metal can be selected so that the baffle is compressed during fuel cell manufacturing process to conform to the height of the flow field. A fuel cell manufacturing process can typically involve pressing the fuel cell layers together under a pressure of 100 kPa to 200 kPa, so the thickness of the sheet metal can be selected to be thin enough to compress under a pressure of 100 kPa to 200 kPa.

The apertures of the baffle can have a combined cross-sectional area corresponding to 0.5% to 2.0% of the area of the flow field. The area of an individual aperture can vary depending on the number of apertures relative to the length of the baffle. This is one of the advantages of using apertures, as the size of the apertures can be selected to reduce or minimize the impact of manufacturing variability. As the size of the apertures is increased, the desired reduction in available cross-sectional area for the flow field can be maintained by reducing the number of apertures. By contrast when using a solid baffle, the size of the gap between the baffle and the surface above the baffle is dictated by the desired cross-sectional area, so there is little or no ability to adjust the solid baffle configuration to mitigate problems due to manufacturing variability.

Based on manufacturing tolerances, it can be beneficial to have apertures with a characteristic dimension of 0.25 mm or more, or 0.5 mm or more, or 0.7 or more, such as up to 1.5 mm (or possibly larger) so that manufacturing variations do not have a substantial impact on the area of an individual aperture. For a substantially round aperture, the characteristic dimension can correspond to the diameter. For an aperture with an oval, oblong, or rectangular shape, the characteristic dimension can correspond to the shortest axis or shortest side. As noted above, a technique such as photochemical etching can create features with a variation of 0.025 mm or less. By using a characteristic dimension of 0.25 mm or more for the apertures (or 0.5 mm or more, or 0.7 mm or more), any manufacturing variations in the apertures will result in less than a +/−10% change in the characteristic dimension. In the limiting case of a round aperture, a change in characteristic dimension of +1-10% corresponds to a change in area of roughly +/−20%. This is in contrast to the situation for a solid baffle, where the combination of variations in the manufacturing of the baffle (+/−0.025 mm) and variations in the flow field height for the assembled fuel cell (+/−0.025 mm) can correspond to up to 60% or more of the desired gap between the baffle and the separator plate above the baffle. For example, for an anode flow field having a height of 4.0 mm, a gap corresponding to 2% of the flow field height would correspond to 0.08 mm. The combined tolerance variations for the flow field height and the baffle height are 0.05 mm, meaning that the gap formed between the baffle and the separator plate above the baffle can vary by as much as +/−60%.

Figures 16, 17:
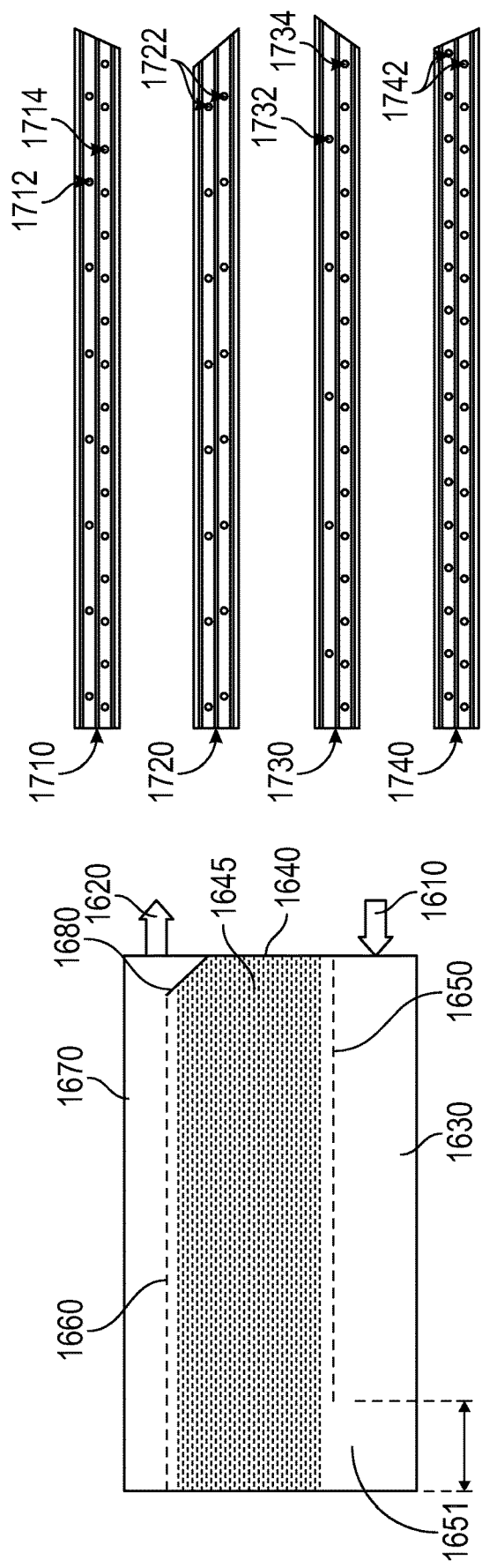
FIG. 16 shows a top view of an example of a reforming unit as an element in a fuel cell stack.
FIG. 17 shows examples of aperture patterns for a baffle.

FIG. 17 shows examples of four different types of aperture patterns for a baffle. In FIG. 17, top down views are shown for four different V-shaped baffles. Generally, the apertures in the two sides of the "V" are not aligned, so that any gas flow passing through an aperture on one side of the baffle has to travel laterally within the baffle before exiting from an aperture on the other side. In other aspects, one or more apertures in the two sides of the "V" could be aligned, but this can allow channeling of gas flow to occur.

Baffle 1710 corresponds to a V-shaped baffle where the aperture pattern is different on the two sides of the V. The baffle 1710 represents a baffle where the apertures 1712 and apertures 1714 are 0.032 inches (0.81 mm) in diameter. The apertures 1714 are spaced apart from each other by 0.233 inches (5.9 mm), while the apertures 1712 are spaced apart from each other by 0.466 inches (11.8 mm).

Baffle 1720 corresponds to a V-shaped baffle where the size and aperture pattern are the same on the two sides of the V, but with the apertures still being offset between the two sides of the V. The baffle 1720 represents a baffle where the apertures 1722 are 0.032 inches (0.81 mm) in diameter. The 1722 are spaced apart from each other by 0.466 inches (11.9 mm).

Baffle 1730 corresponds to a V-shaped baffle where the aperture pattern is different on the two sides of the V. The baffle 1730 represents a baffle where the apertures 1732 and apertures 1734 are 0.030 inches (0.76 mm) in diameter. The apertures 1734 are spaced apart from each other by 0.233 inches (5.9 mm), while the apertures 1732 are spaced apart from each other by 0.698 inches (17.7 mm).

Baffle 1740 corresponds to a V-shaped baffle where the size and aperture pattern are the same on the two sides of the V, but with the apertures still being offset between the two sides of the V. The baffle 1740 represents a baffle where the apertures 1742 are 0.030 inches (0.76 mm) in diameter. The apertures 1742 are spaced apart from each other by 0.233 inches (5.9 mm).

In terms of relative resistance to gas flow for the baffles configurations shown in FIG. 17, baffle 1740 provides the lowest gas flow resistance (i.e., lowest pressure drop), as baffle 1740 has the largest amount of available cross-sectional area for gas to pass through on both sides of the baffle. Baffles 1710 and 1720 provide similar levels of resistance, based on the lowest cross-sectional area sides having roughly the same area of apertures in both baffles. It is noted that baffle 1710 offers slightly less resistance to gas flow due to the greater number of baffles in one of the sides of the V. Baffle 1730 represents the baffle with the highest resistance to gas flow.

Baffles for Integrated Reforming Unit

In some aspects, the baffles described herein can also be used manage flow patterns in a reforming unit that is integrated into a molten carbonate fuel cell stack. The baffles described herein can be used to enable co-current or counter-current flow within the fuel cells in a fuel cell stack while providing improved flow uniformity and/or reaction rate uniformity across the fuel cells. During such co-current or counter-current operation, the pattern of heat generated in a fuel cell will be different from the pattern of heat generated in a fuel cell during cross-flow operation. It would be desirable to develop flow patterns in an integrated reforming unit that allow the heat consumption in the reforming unit to take advantage of the heat generation pattern in the adjacent and/or nearby fuel cells. The baffles described herein can assist with developing such a flow pattern in the reforming unit, in combination with an appropriate selection of a reforming catalyst pattern.

When operating a fuel cell to have co-current or counter-current flow in the anode and cathode, the corresponding pattern of heat generation in the fuel cell can be roughly aligned with the axis corresponding to the direction of co-current or counter-current flow. Using baffles to separate the extended edge wet seal volumes from the anode or cathode can further assist with reducing or minimizing the tendency of gas to try to flow directly from a gas inlet to a gas outlet in the anode and/or cathode. As a result, using baffles can further align the heat generation pattern in a fuel cell operating in co-current or counter-current flow mode with the axis corresponding to the direction of co-current or counter-current flow.

Based on the alignment of the heat generation pattern in a fuel cell with the axis of co-current or counter-current flow, it can be beneficial for any integrated reforming units in the fuel cell stack to have a heat consumption pattern with increased alignment with the axis of flow in the fuel cell. One way to achieve this can be to introduce the hydrocarbon for reforming along the same entry face of the fuel cell stack as the entry face for either the cathode flow or the anode flow.

In some aspects, the baffles described herein can then be used in the reforming unit in a similar manner to the way the baffles are positioned in the anode or cathode. In other words, the baffles can be used to define an entry volume where hydrocarbon for reforming enters and is distributed along the length of the volume prior to contacting any reforming catalyst. The hydrocarbon can then pass through the apertures in the baffle or around the end of the baffle to flow across the reforming catalyst. After reforming, the reforming products can pass through or around a second baffle prior to exiting from the reforming unit. It is noted that the reforming unit does not include an extended volume. Instead, the entry volume and exit volume in the reforming unit are within the footprint of the fuel cell stack.

By using baffles to modify the flow pattern in the reforming unit, a variety of corresponding reforming catalyst patterns can be suitable in the reforming unit. In some aspects, a relatively constant density of reforming catalyst can be used in the area between the baffles. In other aspects, a gradient of catalyst density can be used, so that the density of reforming catalyst is lower near the input baffle and gradually increases until it reaches a highest value near the output baffle. Still other choices for the reforming catalyst pattern can also be suitable. The catalyst pattern can be achieved in any convenient manner. For example, a desired uniform catalyst density or gradient in catalyst density can be achieved by depositing small particles of catalyst in the desired pattern on the bottom and/or top surface of a reforming unit. In various aspects, any convenient type of reforming catalyst can be used.

Flow Pattern Examples

FIG. 8 shows an example of the desired operation of a fuel cell when the anode flow input is re-directed to allow for co-current flow or counter-current flow operation. In FIG. 8, a top cross-sectional view of a fuel cell is shown so that the anode flow field corresponds to the top layer. In FIG. 8, an anode input flow 801 is introduced into an inlet volume 805. The inlet volume 805 includes blocker 810 that re-directs the anode input flow 801 into extended edge seal area 820. The dashed line 830 indicates the position of the baffle, which creates a sufficient pressure drop to allow the anode input flow 801 to distribute across the extended edge seal area 820 before passing through the baffle. The dotted line 832 represents the active area of the anode. As shown in FIG. 8, the position 830 of the baffle is selected so that the anode input flow 801 passes through the baffle prior to reaching the active area of the anode. The anode input flow 801 is substantially evenly distributed across the full length of the anode as the gas flow passes across the active area of the anode. The dashed line 840 indicates the position of the second baffle, which provides a second pressure drop to further assist with maintaining an even distribution of gas flow across the active area of the anode. Blocker 850 reduces, minimizes, or prevents direct passage of gas flow from the anode active area to anode exit volume 860. Instead, the anode output flow 861 is formed by gas that passes through the second baffle (located at position 840) into extended edge seal area 870.

In order to test the gas flow pattern within the active area of the anode for various configurations, a series of tests were performed where air was passed through various anode flow field configurations. During the tests, the flow pattern through the cell was determined by running two types of air flows through a cell with a piece of diazo paper on the bottom surface of the anode flow field. The flow field had a total height (plate thickness plus protrusion height) of roughly 2.3 mm. However, because the baffle rested on the bottom plate of the anode collector at the baffle location, the thickness of the plate is not included for the flow field height at the baffle location. Thus, at the baffle location, the flow field height was roughly 2.0 mm A first air flow, corresponding to air without further additives, was passed into the cell under controlled conditions and allowed to vent to atmosphere on the exit of the cell. This first air flow had sufficient volume to establish the flow pattern in the cell. A second stream of air that had been saturated with ammonium hydroxide was introduced at a series of ports machined into the flow test fixture. The trace air that was concentrated with ammonium hydroxide turned the diazo paper blue showing the direction air was flowing.

This trace stream was <1% of the flow so it did not affect the direction of flow. Since the ammonium hydroxide was consumed by the reaction with the diazo paper, introducing the trace stream via the series of ports allowed the flow pattern to be traced at multiple locations within the cell. The concentration of ammonium hydroxide over the paper affected how dark the flow stream appeared. When there is more air flow in a particular area of the cell the concentration of ammonium hydroxide is low and the flow stream appeared thin and light. When the airflow is lower, the higher concentration of ammonium hydroxide will make the flow stream appear thick and dark. This technique was used to evaluate a series of baffle designs and CFD (computational fluid dynamics) models were calibrated using the results of the flow tests to find the optimized baffle configuration.

FIG. 9 shows results from a configuration where blockers were used to divert the input flow into an extended edge seal area and baffles including apertures were used to achieve a pressure drop of 0.1 kPa or more. In FIG. 9, the input flow 901 is diverted by blocker 910 into extended edge seal area 920. Baffles corresponding to the full height of the flow field, but including apertures to allow for fluid flow, were placed at positions 930 and 940. The apertures provided an available cross-sectional area corresponding to 2.5% or less of the original flow field, so that the pressure drop across the baffles was 0.1 kPa or more. As shown in FIG. 9, this resulted in a gas flow pattern that would be substantially parallel to a cathode gas flow during operation. Based on the measured flow pattern, CFD simulations were performed to model operation of the fuel cell. The CFD simulations indicated improved uniformity in the current density across the fuel cell.

It is noted that in FIG. 9, some flow did occur across blocker 910. This is due to the difficulties with forming a complete seal for a fixed height blocker when assembling a fuel cell. As shown in FIG. 9, this was a relatively low volume flow, and therefore did not pose problems for improving the uniformity of the current density during CFD simulations. A similar low volume flow over blocker 950 was also observed.

In order to illustrate the benefits of a configuration such as the configuration in FIG. 9, a series of comparative configurations were also studied. FIG. 10 shows results from flow testing on a first comparative configuration. In FIG. 10, a blocker was not used to re-direct the input flow into the extended edge wet seal area. Instead, the input flow 1001 was allowed to enter over the anode active area. Solid (cylindrical) baffles were used to block a portion of the flow field. The height of the baffle was roughly 1.6 mm Compared to the flow field height of 2.0 mm at the baffle location, this corresponds to blocking roughly 80% of the total cross-sectional area of the flow field. The positions used for the baffles are shown by dashed lines 1030 and 1040. As shown in FIG. 10, the baffle positions 1030 and 1040 are within the anode active area. Additionally, in the example shown in FIG. 10, the baffles blocked 80% or less of the flow field, so that the pressure drop across each baffle was less than 0.1 kPa. As shown in FIG. 10, because there was not a sufficient pressure drop across the baffles, the flow pattern clearly shows a flow from corner to corner within the anode, rather than from side-to-side (which would be parallel to a cathode flow during operation).

FIG. 11 shows results from flow testing on a second comparative configuration. In FIG. 11, larger solid cylindrical baffles were used, so that the available cross-sectional area of the flow field was reduced to 2.0% of the original cross-sectional area. Once again, blockers were not used and the baffles were placed in positions 1130 and 1140, which are over the active area of the anode during operation. As shown in FIG. 11, by reducing the available cross-sectional area for fluid flow to 2.0% or less, a pressure drop of 0.1 kPa or higher was achieved. This resulted in the flow pattern shown in FIG. 11, which would be substantially parallel to a cathode flow during operation. However, as shown in FIG. 11, the positions 1130 and 1140 of the baffles were over what would be the active area of the anode during operation. When CFD modeling was performed of fuel cell performance using the configuration shown in FIG. 11, the uniformity of the current density was poor. This was due in part to holdup of the input flow prior to passing through the first baffle while still over the active area. Similar non-uniformity was observed one either side of the second baffle.

Based on the CFD modeling performed using the flow results shown in FIGS. 9-11, a substantial improvement in current density could be achieved in a fuel cell by using a blocker to divert the input flow into an extended edge seal area, and the using a baffle to provide a pressure drop of 0.1 kPa or more for gas passing from the extended edge seal area into the active area of the anode (or from the anode active area into the second extended edge seal area).

During the flow testing, an additional difficulty with using baffles to achieve a desired pressure drop was also discovered. Due to limitations in manufacturing techniques, the height of the anode flow field in a molten carbonate fuel cell has a tolerance of +/−0.025 mm. For a solid baffle, the height of the baffle has a similar tolerance of +/−0.025 mm. It was discovered that because this variation was similar in magnitude to the desired gap between the baffle and the separator plate, the accumulation of manufacturing tolerances could cause substantial variation for the pressure drop across the baffle during operation of the fuel cell.

Figure 12:
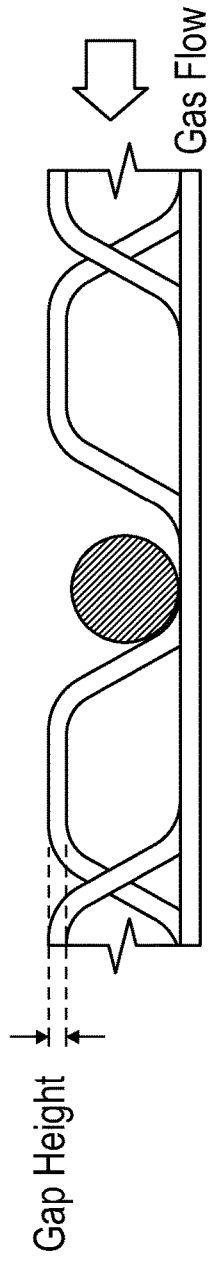
FIG. 12 shows a comparative baffle structure.

FIG. 12 shows an example of a solid cylindrical baffle placed in the flow field for the anode input flow of a flow cell. Although FIG. 12 is not necessarily to scale, the figure does illustrate the problem with attempting to use a baffle with a height on the order of 1-10 mm to control formation of a gap with a height on the order of 0.1 mm.

Figure 13:
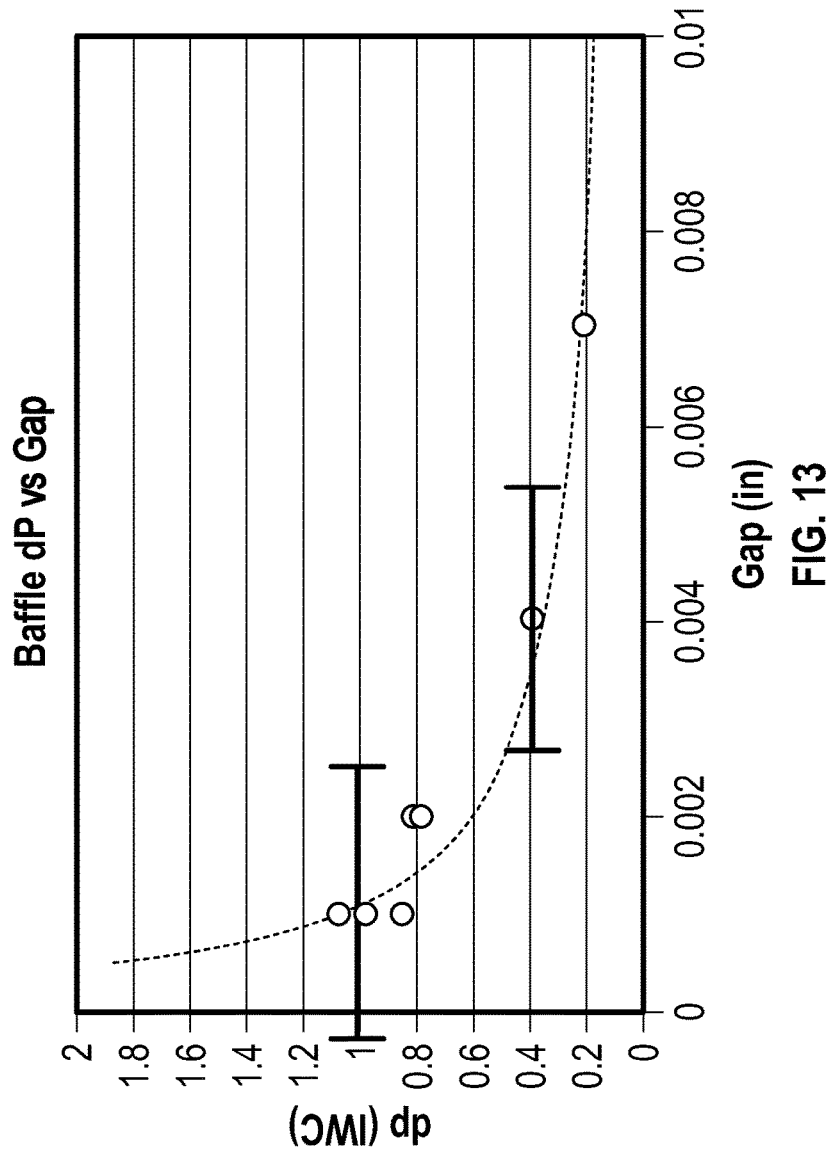
FIG. 13 shows pressure drop variations when using the comparative baffle structure of FIG. 12.

In order to further investigate this difficulty, a series of tests were performed to determine how the pressure drop changed as a function of gap height. FIG. 13 shows the results from those tests. As shown in FIG. 13, for a 2.0 mm flow field, a gap height between the baffle and the separator plate of 0.1 mm (0.004 inches) resulted in a desired pressure drop of roughly 0.1 kPa (or roughly 0.4 inches of water). However, due to manufacturing variability as described above, constructing a fuel cell to have a desired gap height of 0.1 mm could result in an actual gap of 0.05 mm to 0.15 mm (0.002 inches to 0.006 inches). As shown in FIG. 13, this means that the resulting pressure drop across the baffle during operation could range from roughly 0.06 kPa to 0.24 kPa. This would mean that the flow rate could vary by as much as a factor of four between different fuel cells. This substantial variation would result in poor and/or unpredictable performance for fuel cells manufactured using a solid baffle.

Figure 14:
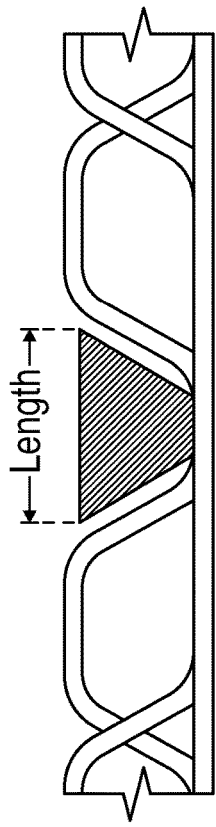
FIG. 14 shows another comparative baffle structure.
Figure 15:
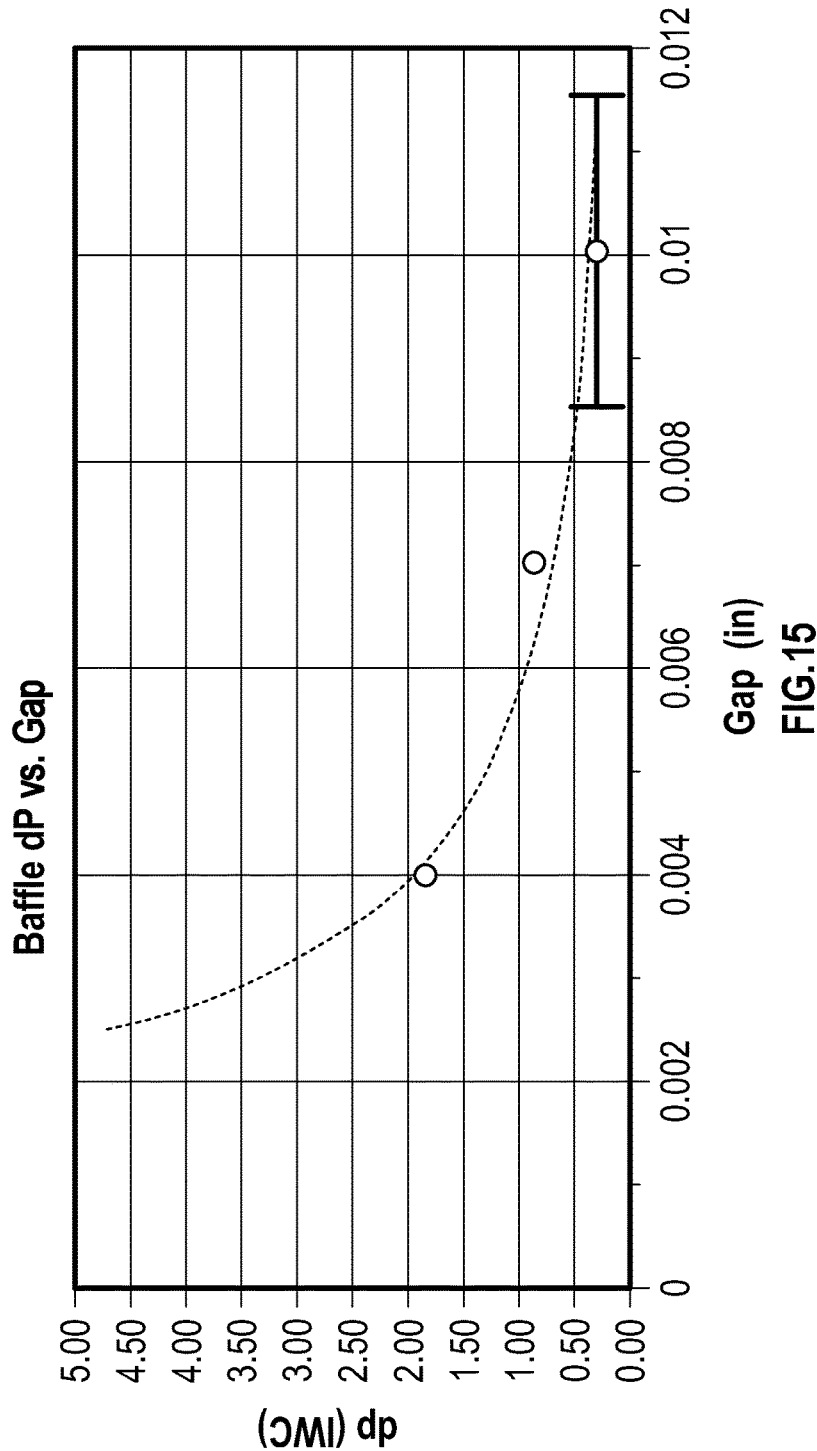
FIG. 15 shows pressure drop variations when using the comparative baffle structure of FIG. 14.

In an effort to mitigate the impact of manufacturing variability, a different baffle shape was tested. FIG. 14 shows an example of a trapezoid shaped baffle, with the long face of the trapezoid at the top. For a round baffle, the flow constriction occurs at a single point corresponding to the top of the cylinder. By contrast, the trapezoid shaped baffle provides a flow restriction along the entire width of the top face. Due to the longer path length of constricted flow, the trapezoid shaped baffle was able to generate the same desired pressure drop of 0.1 kPa at a gap height between the baffle and the separator plate of roughly 0.23 mm, or more than twice the gap height for the cylindrical baffle. However, even with the larger gap height, the variation due to manufacturing tolerances still resulted in a potential variability in pressure drop between different fuel cells of almost 100%. This is shown in FIG. 15.

As described above, forming apertures having a characteristic dimension of 0.25 mm or more (or 0.5 mm or more, or 0.7 mm or more) results in a size variation of 20% or less. Additionally, the magnitude of this size variation could be further reduced by using larger aperture sizes, such as having a variation of 10% or less for apertures with a characteristic dimension of 0.5 mm or more. By contrast, even for the trapezoidal baffle, the variation in gap height due to manufacturing tolerances was greater than 20%. Thus, by using apertures to control the available cross-sectional area for fluid flow, a substantial reduction in manufacturing variability can be achieved so that fuel cell performance can be maintained more consistently between cells.

Reforming Unit Examples

FIG. 16 shows an example of a baffle configuration for use in a reforming unit. In FIG. 16, the hydrocarbon input 1610 for the reforming unit enters on the same side of the fuel cell stack as the reforming outlet 1620. When a hydrocarbon input for reforming enters the reforming unit via hydrocarbon input 1610, the hydrocarbons initially are passed into an entry volume 1630. Preferably, the entry volume does not contain any reforming catalyst. This can allow the hydrocarbons to be distributed along the length of the entry volume 1630 prior to having any reaction with reforming catalyst. The hydrocarbons can then enter the main volume 1640 of the reforming unit where reforming catalyst 1645 is located. The hydrocarbons can enter the main value either by passing through apertures in baffle 1650, or by passing around the end of baffle 1650 if the length of baffle 1650 is less than the length of the entry volume 1630. In some aspects, baffle 1650 can have substantially the same length as the length of the entry volume 1630. In other aspects, the length of the baffle 1650 can be less than the length of the entry volume 1630 by 0.05% or more, or 0.5% or more, or 5% or more, or 10% or more, or 20% or more, such as up to 50% or possibly still higher. Expressed as a ratio, this corresponds to a baffle that has a length that is 0.9995 times the length of the entry volume or less, or 0.995 or less, or 0.95 or less, or 0.90 or less, or 0.80 or less, such as down to 0.5 times the length of the entry volume. For example, the input baffle 1650 shown in FIG. 16 has a length that is roughly 60% of the length of entry volume 1630. This results in a gap or area 1651 where no baffle is present. It is noted that the exit baffle 1660 can independently have a length that is similar to the length of exit volume 1670 or that is shorter than the length of exit volume 1670 by any of the values described above.

After entering main volume 1640, the hydrocarbons are at least partially reformed by reforming catalyst 1645 to form reforming products such as $H_2$. The reforming products can then pass through apertures in exit baffle 1660 and/or around exit baffle 1660 (if the length of exit baffle 1660 is less than the length of exit volume 1670). The reforming products can then exit from exit volume 1670 via reforming outlet 1620. It is noted that an outlet blocker structure 1680 is shown in FIG. 16. The blocker structure provides another structure for reducing, minimizing, or eliminating flow directly from the main volume 1640 to reforming outlet 1620.

Figure 18:
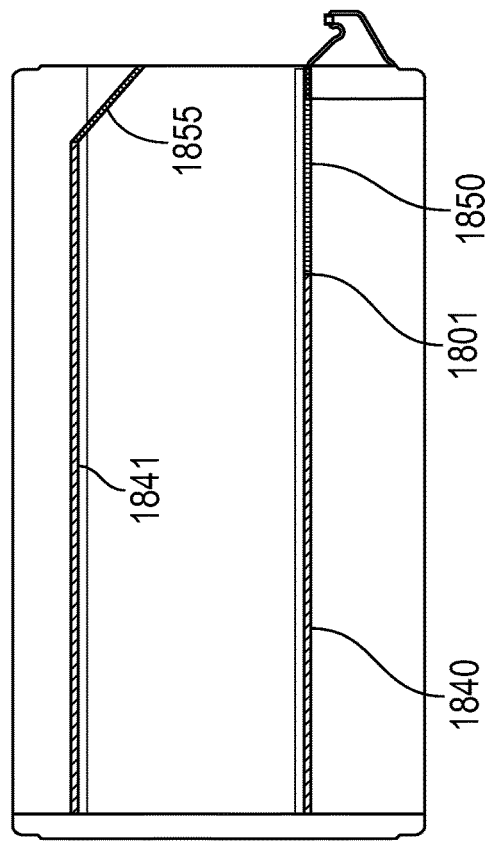
FIG. 18 shows an example of a baffle configuration.

FIG. 18 shows an example of a baffle configuration. In the example shown in FIG. 18, the baffle configuration is used as a baffle for a reforming stack element. In FIG. 18, an initial portion 1850 of the inlet baffle corresponds to a solid blocker (still V-shaped) that does not include apertures. A second portion 1840 of the inlet baffle corresponds to a baffle having the aperture sizes and pattern used for baffle 1740 in FIG. 17. The initial portion 1850 and second portion 1840 meet at location 1801. It is noted that initial portion 1850 and second portion 1840 can correspond to a single baffle piece with different hole patterns etched into initial portion 1850 and second portion 1840. Alternative, two or more pieces can be used to form the baffle. Outlet baffle 1841 corresponds to the aperture sizes and pattern used for baffle 1740 in FIG. 17. A solid blocker 1855 is used to prevent direct flow from the reforming active area to the outlet for the reforming element.

Figure 19:
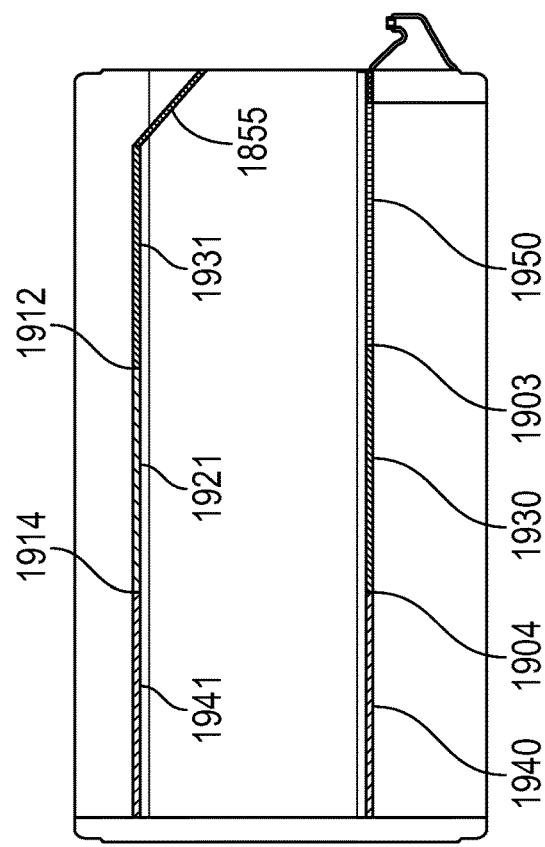
FIG. 19 shows another example of a baffle configuration.

FIG. 19 shows another example of a baffle configuration. In FIG. 19, there are variations in the aperture size and pattern for both the inlet and the outlet baffle. In the example shown in FIG. 19, an initial portion 1950 of the inlet baffle corresponds to a solid blocker that does not include apertures. A second portion 1930 (starting at location 1903) corresponds to the aperture sizes and pattern of baffle 1730 from FIG. 17. A third portion 1940 (starting at location 1904) corresponds to the aperture sizes and pattern of baffle 1740 from FIG. 17. For the outlet baffle, a first portion 1931 corresponds to the aperture sizes and pattern of baffle 1730 from FIG. 17. A second portion 1921 (starting at location 1912) corresponds to the aperture sizes and pattern of baffle 1720 from FIG. 17. A third portion 1941 (starting at location 1914) corresponds to the aperture sizes and pattern of baffle 1740 from FIG. 17.

Figure 21:
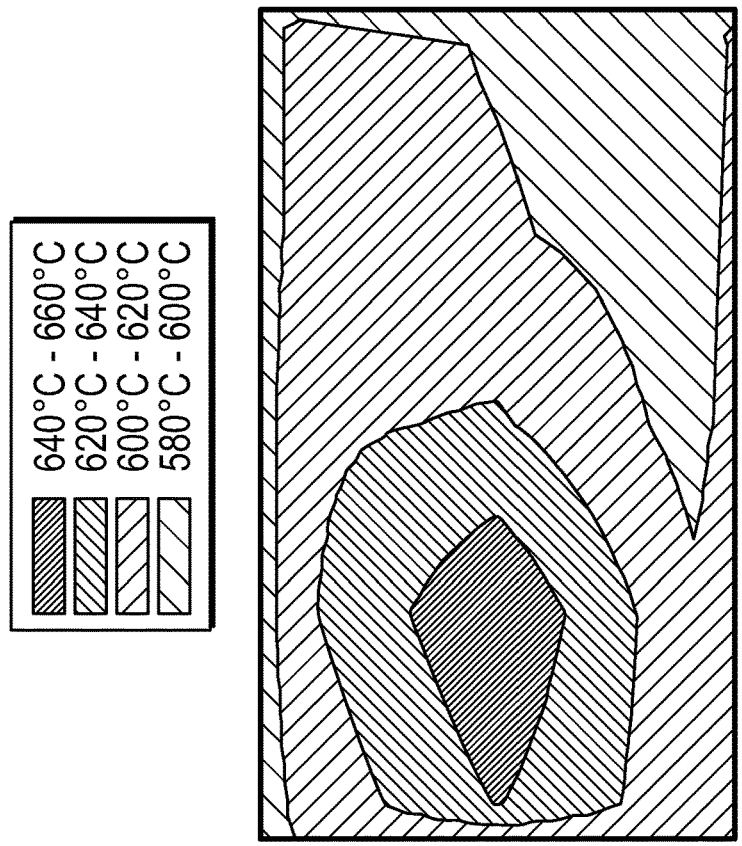
FIG. 21 shows an average temperature profile for a cathode in a fuel cell stack that includes reforming units using a baffle configuration according to FIG. 18.
Figure 20:
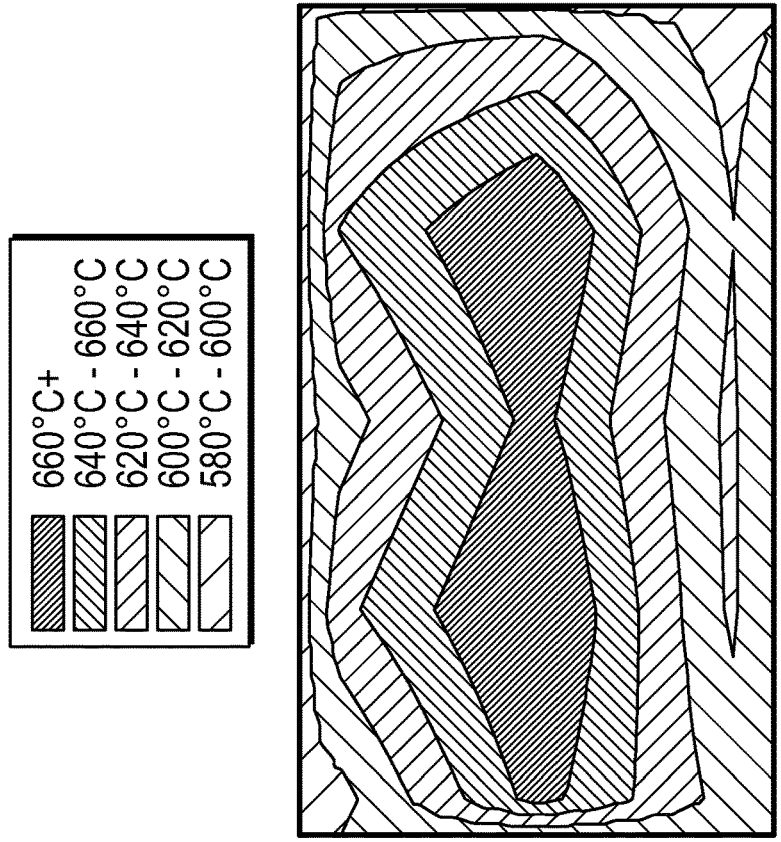
FIG. 20 shows an average temperature profile for a cathode in a fuel cell stack.

FIG. 20 and FIG. 21 show the temperature profiles from operation of two fuel cell stacks. In FIG. 20, the average cathode temperature profile is shown for cathodes in a fuel cell stack that did not include any reforming units as elements in the stack. The fuel cell stack in FIG. 20 was operated at a current density of 130 mA/cm$^2$, a fuel utilization of 50%, and a $CO_2$ utilization of 70%. The concentration of $CO_2$ in the cathode input flow was 8.4 vol %. The fuel cell was operated in a counter-current flow mode. For FIG. 21, a similar fuel cell stack was used, but a reforming unit was inserted between every 6 fuel cells. In the reforming unit, the baffle configuration shown in FIG. 18 was used. The operating conditions were the same as for FIG. 20, with the exception that the fuel utilization in FIG. 21 was 55% instead of 50%. Based on having the same current density, however, it is believed that FIG. 20 and FIG. 21 provide a good comparison of the impact of including reforming units on the average cathode temperature profile. It is noted that the direction of flow for the reforming units in the stack corresponding to FIG. 21 was co-current with the direction of the anode flow.

Figure 22:
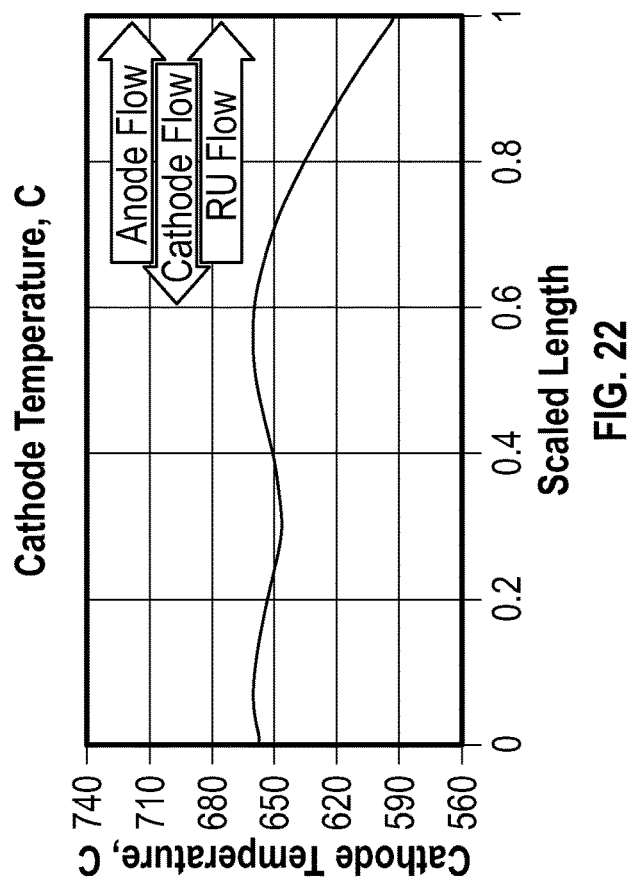
FIG. 22 shows the temperature profile of the cathode from FIG. 21 along the centerline of the cathode.

As shown in FIG. 20, the fuel cell stack operated without the integrated reforming units showed a substantial amount of temperature variation in the average cathode temperature profile. In particular, in two separate regions, the average cathode temperature was greater than 660° C., with a peak temperature of 688° C. As shown in FIG. 21, the addition of reforming units as elements in the fuel cell stack (one reforming unit per six fuel cells) resulted in a decrease in the peak temperature from 688° C. to 659° C., while maintaining roughly the same lowest temperature in the fuel cell of near 590° C. The temperature profile in FIG. 21 can be more clearly seen in FIG. 22, which shows the average cathode temperature along a line in the center of the fuel cell that is parallel to the axis of the counter-current flow.

Figure 23:
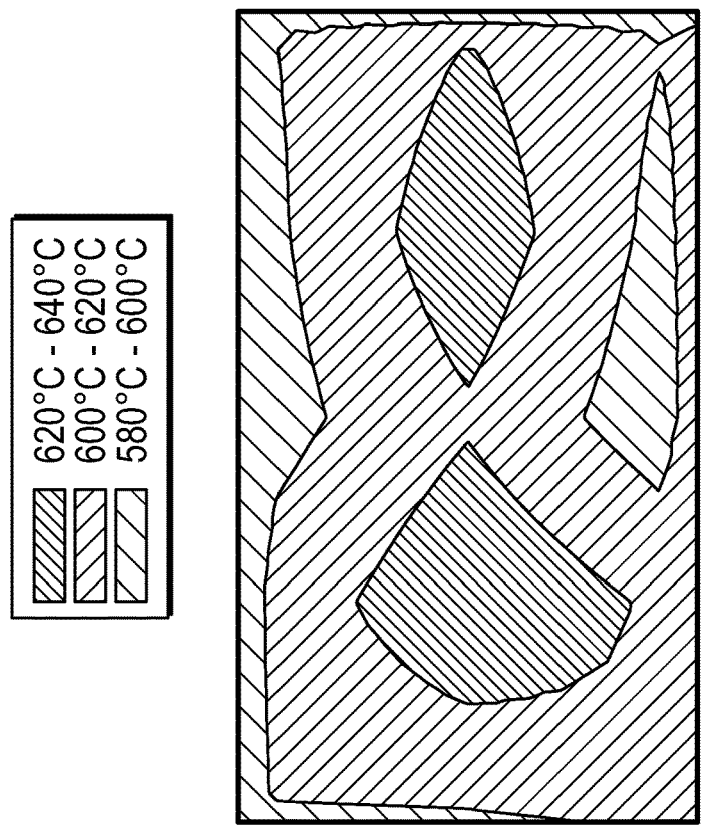
FIG. 23 shows an average temperature profile for a cathode in a fuel cell stack that includes reforming units using a baffle configuration according to FIG. 19.

A further improvement in the temperature profile was achieved by using the baffle configuration from FIG. 19. In another test run, a fuel cell stack with one reforming unit per six fuel cells was used, but the reforming units included the baffle configuration shown in FIG. 19. The resulting temperature profile in the cathode is shown in FIG. 23. As shown in FIG. 23, the lowest temperature is still near 590° C., but the maximum temperature is now between 620° C. and 630° C.

Additional Embodiments

Embodiment 1. An element in a molten carbonate fuel cell stack, comprising: a gas flow inlet; a first volume in fluid communication with the gas flow inlet; a second volume comprising at least a portion of an anode active area of a fuel cell anode, at least a portion of a cathode active area of a fuel cell cathode, or reforming catalyst, the second volume being in fluid communication with the gas flow inlet via the first volume; an inlet baffle comprising a plurality of inlet baffle apertures at an inlet boundary between the first volume and the second volume, at least a portion of the fluid communication between the first volume and the second volume comprising fluid flow through the plurality of inlet baffle apertures, a length of the inlet baffle comprising at least 60% of a length of the inlet boundary, an average height of the inlet baffle comprising 100% or more of an average height along the inlet boundary, a combined cross-sectional area of the plurality of inlet baffle apertures comprising 0.5% to 6.0% of a total cross-sectional area at the inlet boundary; and a gas flow outlet in fluid communication with the second volume.

Embodiment 2. The fuel cell stack element of Embodiment 1, wherein at least one of the plurality of inlet baffle apertures has a characteristic dimension of 0.25 mm or more; or wherein each of the plurality of inlet baffle apertures has a characteristic dimension of 0.25 mm or more.

Embodiment 3. The fuel cell stack element of any of the above embodiments, wherein the combined cross-sectional area of the plurality of inlet baffle apertures is 0.5% to 2.5% of the total cross-sectional area at the inlet boundary; or wherein a length of the inlet baffle is less than the length of the inlet boundary by 0.05% to 5.0% of the length of the inlet boundary; or a combination thereof.

Embodiment 4. The fuel cell stack element of any of the above embodiments, further comprising: a third volume in fluid communication with the gas flow outlet, the gas flow outlet being in indirect fluid communication with the second volume via the third volume; an outlet baffle comprising a plurality of outlet baffle apertures at an outlet boundary between the first volume and the second volume, at least a portion of the fluid communication between the first volume and the second volume comprising fluid flow through the plurality of outlet baffle apertures, a length of the outlet baffle comprising at least 60% of a length of the outlet boundary, an average height of the outlet baffle comprising 100% or more of an average height along the outlet boundary, a combined cross-sectional area of the plurality of outlet baffle apertures comprising 0.5% to 6.0% of a total cross-sectional area at the outlet boundary.

Embodiment 5. The fuel cell stack element of Embodiment 4, wherein the combined cross-sectional area of the plurality of inlet baffle apertures is different from the combined cross-sectional area of the plurality of outlet baffle apertures; or wherein one or more inlet baffle apertures comprise a different characteristic dimension than one or more outlet baffle apertures; or wherein a length of the inlet baffle is different than a length of the outlet baffle; or a combination thereof.

Embodiment 6. The fuel cell stack element of any of the above embodiments, wherein apertures in a portion of the inlet baffle that is farthest from the gas flow inlet comprise 25% or more of the combined cross-sectional area of the inlet baffle apertures, the portion of the inlet baffle comprising 5% to 20% of a length of the inlet boundary.

Embodiment 7. The fuel cell stack element of any of Embodiments 1-6, wherein the second volume comprises reforming catalyst, and wherein the gas flow inlet is adjacent to a first side of a fuel cell stack, the gas flow outlet optionally being adjacent to the first side of the fuel cell stack.

Embodiment 8. The fuel cell stack element of any of Embodiments 1-6, wherein the second volume comprises at least a portion of an anode active area and an associated anode flow field, the first volume comprising at least a portion of an extended edge seal input chamber, the extended edge seal input chamber being adjacent to a first side of a fuel cell stack, the gas flow inlet being adjacent to a second side of the fuel cell stack.

Embodiment 9. The fuel cell stack element of Embodiment 8, wherein the gas flow inlet further comprises an inlet flow blocker, the inlet flow blocker being positioned at an oblique angle relative to the inlet baffle; or wherein the second volume further comprises an outlet flow blocker, the outlet flow blocker being positioned at an oblique angle relative to the inlet baffle; or a combination thereof.

Embodiment 10. The fuel cell stack element of any of Embodiments 1-6, wherein the second volume comprises at least a portion of a cathode active area and an associated cathode flow field, the first volume comprising at least a portion of an extended edge seal input chamber, the extended edge seal input chamber being adjacent to a first side of a fuel cell stack, the gas flow inlet being adjacent to a second side of the fuel cell stack.

Embodiment 11. The fuel cell stack element of Embodiment 10, wherein the gas flow inlet further comprises an inlet flow blocker, the blocker being positioned at an oblique angle relative to the inlet baffle.

Embodiment 12. The fuel cell stack element of any of Embodiments 8-11, further comprising an extended edge seal output chamber adjacent to a third side of the fuel cell stack; a gas flow outlet in fluid communication with a first output chamber volume of the extended edge seal output chamber; and an outlet baffle comprising a plurality of outlet baffle apertures at an outlet boundary of the first output chamber volume, a cross-sectional area of the plurality of outlet baffle apertures being 0.5% to 6.0% of a total cross-sectional flow field area at the outlet boundary, the first output chamber volume being in fluid communication with the second volume.

Embodiment 13. The fuel cell stack element of any of the above embodiments, wherein the length of the inlet baffle comprises the length of the inlet boundary.

Embodiment 14. The fuel cell stack element of any of the above embodiments, wherein the baffle comprises a V-shaped baffle having a first side and a second side, and wherein apertures in the first side have at least one of a different aperture size and a different aperture pattern relative to apertures in the second side.

Embodiment 15. Use of a fuel cell stack comprising a fuel cell stack element according to any of the above embodiments, a pressure drop across the inlet baffle during use optionally being 0.1 kPa to 1.0 kPa.

All numerical values within the detailed description and the claims herein are modified by "about" or "approximately" the indicated value, and take into account experimental error and variations that would be expected by a person having ordinary skill in the art.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications that fall within the true spirit/scope of the invention.

The invention claimed is:

1. A fuel cell stack, comprising:
a cathode input manifold adjacent to a cathode input side of the fuel cell stack;
an anode input manifold adjacent to an anode input side of the fuel cell stack that is different from the cathode input side;
a cathode output manifold adjacent to a cathode output side of the fuel cell stack that is different from the cathode input side and the anode input side;
a fuel cell comprising:
an anode comprising an anode inlet located on the anode input side of the fuel cell stack, an extended edge seal input chamber, and an anode active area, the anode inlet being in fluid communication with the anode input manifold, the extended edge seal input chamber being located on the cathode input side or the cathode output side, and the extended edge seal input chamber being in fluid communication with the anode inlet and the anode active area through an anode active area inlet, wherein the anode active area inlet is located on the cathode input side or the cathode output side;
a cathode comprising a cathode inlet and a cathode active area, the cathode inlet being substantially parallel to the anode inlet;
an electrolyte matrix layer separating the anode and the cathode; and
an inlet baffle located adjacent to the anode active area inlet, the inlet baffle comprising a plurality of inlet baffle apertures at an inlet boundary between the extended edge seal input chamber and the anode inlet, at least a portion of the fluid communication between the extended edge seal input chamber and the anode inlet comprising fluid flow through the plurality of inlet baffle apertures, a length of the inlet baffle comprising at least 60% of a length of the inlet boundary, an average height of the inlet baffle comprising 100% or more of an average height along the inlet boundary, a combined cross-sectional area of the plurality of inlet baffle apertures comprising 0.5% to 6.0% of a total cross-sectional area at the inlet boundary.

2. The fuel cell stack of claim 1, wherein at least one of the plurality of inlet baffle apertures has a characteristic dimension of 0.25 mm or more; or wherein each of the plurality of inlet baffle apertures has the characteristic dimension of 0.25 mm or more.

3. The fuel cell stack of claim 1, wherein the combined cross-sectional area of the plurality of inlet baffle apertures is 0.5% to 2.5% of the total cross-sectional area at the inlet boundary; or wherein a length of the inlet baffle is less than the length of the inlet boundary by 0.05% to 5.0% of the length of the inlet boundary; or a combination thereof.

4. The fuel cell stack of claim 1, wherein the length of the inlet baffle comprises the length of the inlet boundary.

5. The fuel cell stack of claim 1, further comprising:
an anode outlet in fluid communication with an anode outlet manifold and the anode outlet in fluid communication with the anode active area; and
an outlet baffle comprising a plurality of outlet baffle apertures at an outlet boundary between the anode active area and the anode outlet manifold, at least a portion of a fluid communication between the anode active area and the anode outlet manifold comprising fluid flow through the plurality of outlet baffle apertures, a length of the outlet baffle comprising at least 60% of a length of the outlet boundary, an average height of the outlet baffle comprising 100% or more of an average height along the outlet boundary, a combined cross-sectional area of the plurality of outlet baffle apertures comprising 0.5% to 6.0% of a total cross-sectional area at the outlet boundary.

6. The fuel cell stack of claim 5, wherein the combined cross-sectional area of the plurality of inlet baffle apertures is different from the combined cross-sectional area of the plurality of outlet baffle apertures; or wherein one or more inlet baffle apertures comprise a different characteristic dimension than one or more outlet baffle apertures; or wherein a length of the inlet baffle is different than a length of the outlet baffle; or a combination thereof.

7. The fuel cell stack of claim 1, wherein inlet baffle apertures in a portion of the inlet baffle that is farthest from the anode inlet comprise 25% or more of the combined cross-sectional area of the inlet baffle apertures, the portion of the inlet baffle comprising 5% to 20% of a length of the inlet boundary.

8. The fuel cell stack of claim 1, wherein the extended edge seal input chamber is configured to receive anode inlet gas provided to the fuel cell stack from the anode input manifold in a first direction relative to the fuel cell stack and output the anode inlet gas into the anode inlet in a second direction substantially perpendicular to the first direction.

9. The fuel cell stack of claim 1, further comprising: a second extended edge seal chamber extending away from the anode active area on a side opposite the anode inlet, wherein the second extended edge seal chamber is configured to receive an anode process gas and divert the anode process gas to an anode outlet manifold.

10. The fuel cell stack of claim 1, wherein the anode active area comprises a reforming catalyst.

11. The fuel cell stack of claim 10, wherein the inlet baffle comprises a V-shaped baffle having a first side and a second side, and wherein apertures in the first side have at least one of a different aperture size and a different aperture pattern relative to apertures in the second side.

* * * * *